(12) United States Patent
Leidenfrost

(10) Patent No.: US 10,864,641 B2
(45) Date of Patent: Dec. 15, 2020

(54) END EFFECTOR

(71) Applicant: Bastian Solutions, LLC, Indianapolis, IN (US)

(72) Inventor: Hans Tokpa Leidenfrost, Boise, ID (US)

(73) Assignee: Bastian Solutions, LLC, Indianapolis, IN (US)

( * ) Notice: Subject to any disclaimer, the term of this patent is extended or adjusted under 35 U.S.C. 154(b) by 0 days.

(21) Appl. No.: 16/205,367

(22) Filed: Nov. 30, 2018

(65) Prior Publication Data

US 2019/0168396 A1    Jun. 6, 2019

Related U.S. Application Data

(60) Provisional application No. 62/593,779, filed on Dec. 1, 2017.

(51) Int. Cl.
| | | |
|---|---|---|
| B25J 15/06 | (2006.01) | |
| B25J 9/16 | (2006.01) | |
| B25J 15/00 | (2006.01) | |
| B25J 15/10 | (2006.01) | |
| B25J 5/00 | (2006.01) | |

(Continued)

(52) U.S. Cl.
CPC .......... B25J 15/0625 (2013.01); B25J 5/007 (2013.01); B25J 9/1697 (2013.01); B25J 15/0009 (2013.01); B25J 15/022 (2013.01); B25J 15/0616 (2013.01); B25J 15/0633 (2013.01); B25J 15/103 (2013.01); B25J 15/106 (2013.01); B25J 15/12 (2013.01); B25J 19/023 (2013.01)

(58) Field of Classification Search
CPC ............. B25J 15/0625; B25J 15/0009; B25J 15/0633; B25J 15/106; B25J 15/12; B25J 15/104; B25J 15/0616; B25J 9/1697; B25J 5/007; B25J 15/022; B25J 15/103; B25J 19/023
USPC .......................................... 294/213
See application file for complete search history.

(56) References Cited

U.S. PATENT DOCUMENTS 5,484,091 A    1/1996   Malinowski et al.
6,652,213 B1   11/2003  Mitchell et al.
(Continued)

FOREIGN PATENT DOCUMENTS

| JP | H08-323676 A | 12/1996 |
| JP | 2014-151371 | 8/2014 |
| WO | 2011050112 A2 | 4/2011 |

OTHER PUBLICATIONS

Bastian Solutions "Season's Greetings" Published Dec. 14, 2017. [retrieved Dec. 19, 2017]. 1 page. Retrieved from the Internet: <URL: https://www.youtube.com/watch?v=aVUmlled9fg.

(Continued)

*Primary Examiner* — Stephen A Vu
(74) *Attorney, Agent, or Firm* — Woodard, Emhardt, Henry, Reeves & Wagner LLP

(57) ABSTRACT

A robotic system includes an end effector with one or more fin grippers that have one or more vacuum ports. The fin grippers are made of elastic material. The fin grippers each include contact and exterior flanges joined together with a series of crossbeams. The crossbeams each define a tube opening to form a tube guide channel between the contact and exterior flanges. In one form, the vacuum ports are located at fingertip ends of the fin grippers, and the vacuum ports include vacuum cups.

26 Claims, 18 Drawing Sheets

(51) Int. Cl.
*B25J 15/02* (2006.01)
*B25J 19/02* (2006.01)
*B25J 15/12* (2006.01)

(56) References Cited

U.S. PATENT DOCUMENTS

| | | | |
|---|---|---|---|
| 8,403,614 | B2 | 3/2013 | Bastian, II et al. |
| 8,684,418 | B2 * | 4/2014 | Lin ................. B25J 15/0061 269/21 |
| 8,790,061 | B2 | 7/2014 | Y:amashita |
| 9,122,566 | B2 | 9/2015 | Bastian, II et al. |
| 9,452,537 | B2 | 9/2016 | Nammoto et al. |
| 9,486,927 | B1 * | 11/2016 | Morey ................. B25J 15/10 |
| 9,550,624 | B2 | 1/2017 | Khodl et al. |
| 2005/0110292 | A1 * | 5/2005 | Baumann ............. B25J 9/0012 294/188 |
| 2006/0072988 | A1 | 4/2006 | Hariki et al. |
| 2011/0290796 | A1 | 12/2011 | Burgess |
| 2012/0280526 | A1 * | 11/2012 | Lin ................. B25J 15/0061 294/183 |
| 2013/0034420 | A1 | 2/2013 | Hjornet et al. |
| 2014/0103676 | A1 * | 4/2014 | Nammoto ........... B25J 15/0009 294/213 |
| 2014/0197652 | A1 * | 7/2014 | Wang ................. B25J 15/0009 294/185 |
| 2015/0032252 | A1 | 1/2015 | Galluzzo et al. |
| 2015/0098775 | A1 | 4/2015 | Razumov |
| 2016/0089793 | A1 | 3/2016 | Truebenbach |
| 2016/0114482 | A1 | 4/2016 | Lessing et al. |
| 2016/0136809 | A1 | 5/2016 | Subotincic |
| 2016/0214808 | A1 | 7/2016 | Cyrulik et al. |
| 2016/0339590 | A1 | 11/2016 | Lin et al. |
| 2017/0066592 | A1 | 3/2017 | Bastian, II et al. |
| 2017/0197316 | A1 | 7/2017 | Wagner et al. |
| 2017/0203443 | A1 | 7/2017 | Lessing et al. |

OTHER PUBLICATIONS

BionicTripod with FinGripper. [retrieved Nov. 30, 2018]. 2 pages. Retrieved from the Internet: <URL: https://www.festo.com/cms/en_corp/9779.htm>.

Crooks, W. et al, Fin Ray® Effect Inspired Soft Robotic Gripper: From the RoboSoft Grand Challenge toward Optimization. [retrieved Nov. 20, 2018]. 9 pages. Retrieved from the Internet: <URL: https://www.frontiersin.org/articles/10.3389/frobt.2016.00070>.

Exotec Solutions "Skypod system, developed by Exotec Solutions." Published Dec. 7, 2017. [retrieved Dec. 18, 2017]. 1 page. Retrieved from the Internet: <URL: http://https://www.youtube.com/watch?v=uclGrc_Y-f4&sns=em>.

Fish Fins Inspire Robotic Gripper Design. [retrieved Nov. 30, 2018]. 2 pages. Retrieved from the Internet: <URL: https://www.packagingdigest.com/automation/fish-fins-inspire-robotic-gripper-design>.

International Patent Application PCT/US2018/063343 International Search Report and Written Opinion dated Apr. 1, 2019. 21 pages.

* cited by examiner

END EFFECTOR

CROSS REFERENCE TO RELATED APPLICATIONS

This application claims the benefit of U.S. Provisional Patent Application No. 62/593,779, filed on Dec. 1, 2017, which is hereby incorporated by reference.

BACKGROUND

The present disclosure relates to robotics, and more particularly to robotic arms and attachments thereof.

The robotics industry includes robotic arms that are capable of many degrees of freedom. These arms are often used to perform tasks that are repetitive or dangerous for a person. For example, a robotic arm may be tasked with industrial welding, such as in an automobile factory. In another example, a robotic arm may load a machine with parts, such as blanks for a CNC mill. In another example, an arm may be tasked with moving objects from one location to another.

In performing these tasks, the robotic arm will often be required to dexterously interact with objects. To achieve the needed level of dexterity, an additional apparatus, such as an end effector, is often paired with the robotic arm. End effectors are typically chosen to best suit the task that the robotic arm will perform. For example, an end effector may have two fingers that can open and close, thus enabling the robotic arm to pick up the object. Typically, these fingers are fashioned from rigid materials and move in predefined opening or closing paths.

Automated Guided Vehicles ("AGVs") are currently being used in industry to move goods through warehouse systems. AGVs are often electrical in nature, using electric motors connected to wheels to traverse a warehouse environment. Some embodiments of AGVs are automated versions of traditionally non-automated vehicles, such as fork lifts. Other embodiments are designed from the beginning for autonomous operation. AGVs often use vision systems, such as lidar, coupled with a computing system to create a digital representation of the space surrounding it.

Thus, there is a need for improvement in this field.

SUMMARY

A unique end effector or end of arm tool (EoAT) has been developed that can be used on an Automated Mobile Unit (AMU) such as a robotic shuttle. The EoAT includes a combination of a fin gripper with strategically placed vacuum cups. In particular, the EoAT includes three fin grippers, an extendable palm vacuum cup, fingertip vacuum cups placed at the ends of the fin grippers, and inside finger digit vacuum cups. This unique combination allows the EoAT to pick a wide variety of items both large and small as well as those that are difficult to handle. In particular, the system allows individual products to be picked up via the fin grippers, a vacuum pickup followed by using the grippers, a single gripping option where the finger tips on the ends of the fins are used alone, a multi-tip configuration in which the vacuum cups at the end of the tips are brought closer together and all of them are used to pick up the individual products, and a single finger adjacent picking up using the inside. Of course, there other ways in which the EoAT can pick or manipulate items. While the illustrated example includes three fin grippers, other examples can include more or less of them.

Aspect 1 generally concerns a system that includes a end effector including one or more fin grippers having one or more vacuum ports.

Aspect 2 generally concerns the system of any previous aspect in which the vacuum ports are located at fingertip ends of the fin grippers.

Aspect 3 generally concerns the system of any previous aspect in which the vacuum ports include vacuum cups.

Aspect 4 generally concerns the system of any previous aspect in which the vacuum ports are located on interior surfaces of the fin grippers.

Aspect 5 generally concerns the system of any previous aspect in which the fin grippers are made of elastic material.

Aspect 6 generally concerns the system of any previous aspect in which the fin grippers each include contact and exterior flanges joined together with a series of crossbeams.

Aspect 7 generally concerns the system of any previous aspect in which the contact and exterior flanges are joined together and extend at an acute angle from a fingertip.

Aspect 8 generally concerns the system of any previous aspect in which the fin grippers have an asymmetric shape.

Aspect 9 generally concerns the system of any previous aspect in which the contact flange is straight and the exterior flange is curved.

Aspect 10 generally concerns the system of any previous aspect in which the crossbeams each define a tube opening to form a tube guide channel between the contact and exterior flanges.

Aspect 11 generally concerns the system of any previous aspect in which the finger grippers have a vacuum port support bracket at the fingertip.

Aspect 12 generally concerns the system of any previous aspect in which the end effector includes a pneumatic sensor manifold configured to sense the vacuum applied by the vacuum cups.

Aspect 13 generally concerns the system of any previous aspect in which the end effector includes a controller configured to receive pressure data from the pneumatic sensor manifold.

Aspect 14 generally concerns the system of any previous aspect in which the end effector includes one or more tubes connecting the pneumatic sensor manifold and the vacuum cups.

Aspect 15 generally concerns the system of any previous aspect in which the fin grippers define one or more vacuum tube guide channels in which the tube extends inside the fin grippers.

Aspect 16 generally concerns the system of any previous aspect in which the end effector includes an actuator configured to actuate the fin grippers.

Aspect 17 generally concerns the system of any previous aspect in which the actuator includes a linkage drive and one or more linkages coupled between the fin grippers and the drive.

Aspect 18 generally concerns the system of any previous aspect in which the actuator includes a motor and a gearbox operatively connected between the motor and linkage drive.

Aspect 19 generally concerns the system of any previous aspect in which the actuator includes a threaded drive shaft and a linkage plate threadedly connected to the drive shaft.

Aspect 20 generally concerns the system of any previous aspect in which the end effector includes a hub with a palm plate to which the fin grippers are pivotally coupled.

Aspect 21 generally concerns the system of any previous aspect in which the vacuum cups includes an extendable palm vacuum cup configured to extend from the palm plate.

3

Aspect 22 generally concerns the system of any previous aspect in which the end effector has one or more sensors coupled to the palm plate.

Aspect 23 generally concerns the system of any previous aspect in which the sensors include a vision system sensor.

Aspect 24 generally concerns a fin gripper including a series of crossbeams with tube openings to form a tube guide channel.

Aspect 25 generally concerns a method of gripping a first object with fin grippers of an EoAT and securing a second object with vacuum ports.

Aspect 26 generally concerns a finger that includes a top side, a bottom side, a first end, and a second end. The top side includes a semicircular portion spanning between the first end and the second end of the finger. A first vacuum port is formed within the first end. A second vacuum port is formed within the second end. A vacuum duct connects the first vacuum port to the second vacuum port, formed within the semicircular portion.

Aspect 27 generally concerns the finger of any previous aspect in which the finger includes an elastomeric material.

Aspect 28 generally concerns the finger of any previous aspect which includes one or more bands spanning a distance between the top side and the bottom side.

Aspect 29 generally concerns the finger of any previous aspect in which the finger further includes a third vacuum port formed within the bottom side and connected to the vacuum duct.

Aspect 30 generally concerns the finger of any previous aspect in which the finger further includes a check valve positioned between the vacuum duct and the second vacuum port.

Aspect 31 generally concerns the finger of any previous aspect in which the finger further includes a pivot opening and an actuator connection portion both formed into the first end.

Aspect 32 generally concerns an end effector that includes a first finger and a second finger. The first finger has a first end and a second end. The first finger includes a first vacuum port, a second vacuum port, and a vacuum duct connecting the first and second vacuum ports. The first end of the first finger is pivotally mounted to a hub. The second finger has a first end and a second end. The second finger includes a first vacuum port, a second vacuum port, and a vacuum duct connecting the first and second vacuum ports. The first end of the second finger is pivotally mounted to the hub.

Aspect 33 generally concerns the end effector of any previous aspect that further includes a first motor, a first actuator linkage, and a second actuator linkage. The first actuator linkage is connected to the first end of the first finger, and the first actuator linkage is connected to the first motor. The second actuator linkage is connected to the first end of the second finger, and the second actuator linkage is connected to the first motor.

Aspect 34 generally concerns the end effector of any previous aspect that further includes a third finger. The third finger has a first end and a second end. The third finger includes a first vacuum port, a second vacuum port, and a vacuum duct connecting the first and second vacuum ports. The first end of the third finger is pivotally mounted to the hub. A third actuator linkage is connected to the first end of the third finger, and the third actuator linkage is connected to the first motor.

Aspect 35 generally concerns the end effector of any previous aspect that further includes an extendable vacuum projection mounted substantially within the hub.

4

Aspect 36 generally concerns the end effector of any previous aspect that further includes a second motor. The second motor is connected to the extendable vacuum projection.

Aspect 37 generally concerns the end effector of any previous aspect in which the hub is configured to connect to a robotic arm.

Aspect 38 generally concerns the end effector of any previous aspect in which the first finger includes an elastomeric material.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
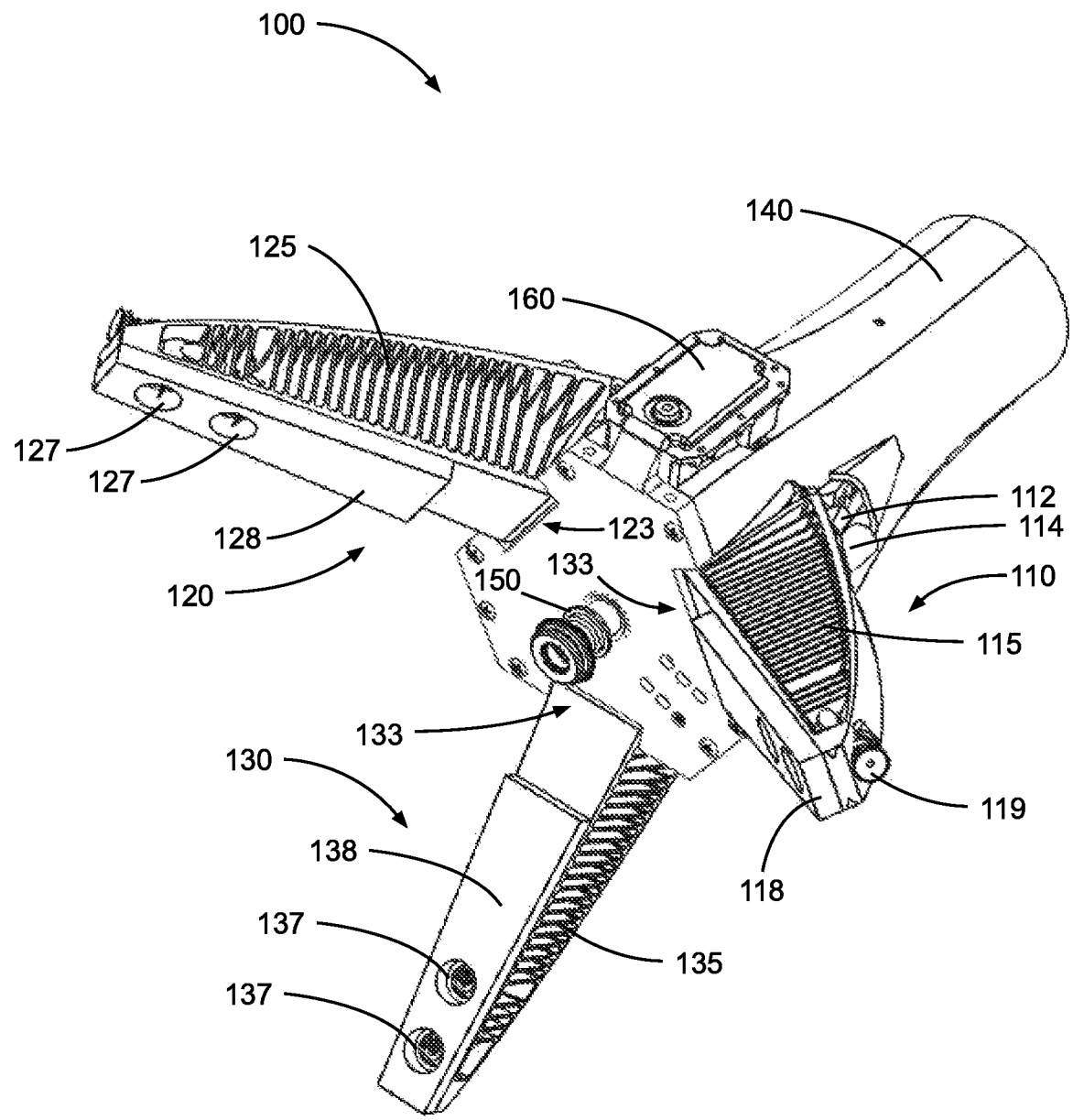
FIG. 1 shows a perspective view of an embodiment of an end effector.

In the following description, reference is made to the accompanying drawings that form a part thereof, which is shown by way of illustration of specific exemplary embodiments in which the invention may be practiced. These embodiments are described in sufficient detail to enable those skilled in the art to practice the invention, and it is to be understood that modifications to the various disclosed embodiments may be made, and other embodiments may be utilized, without departing from the spirit and scope of the present invention. The following detailed description is, therefore, not to be taken in a limiting sense.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Figure 2:
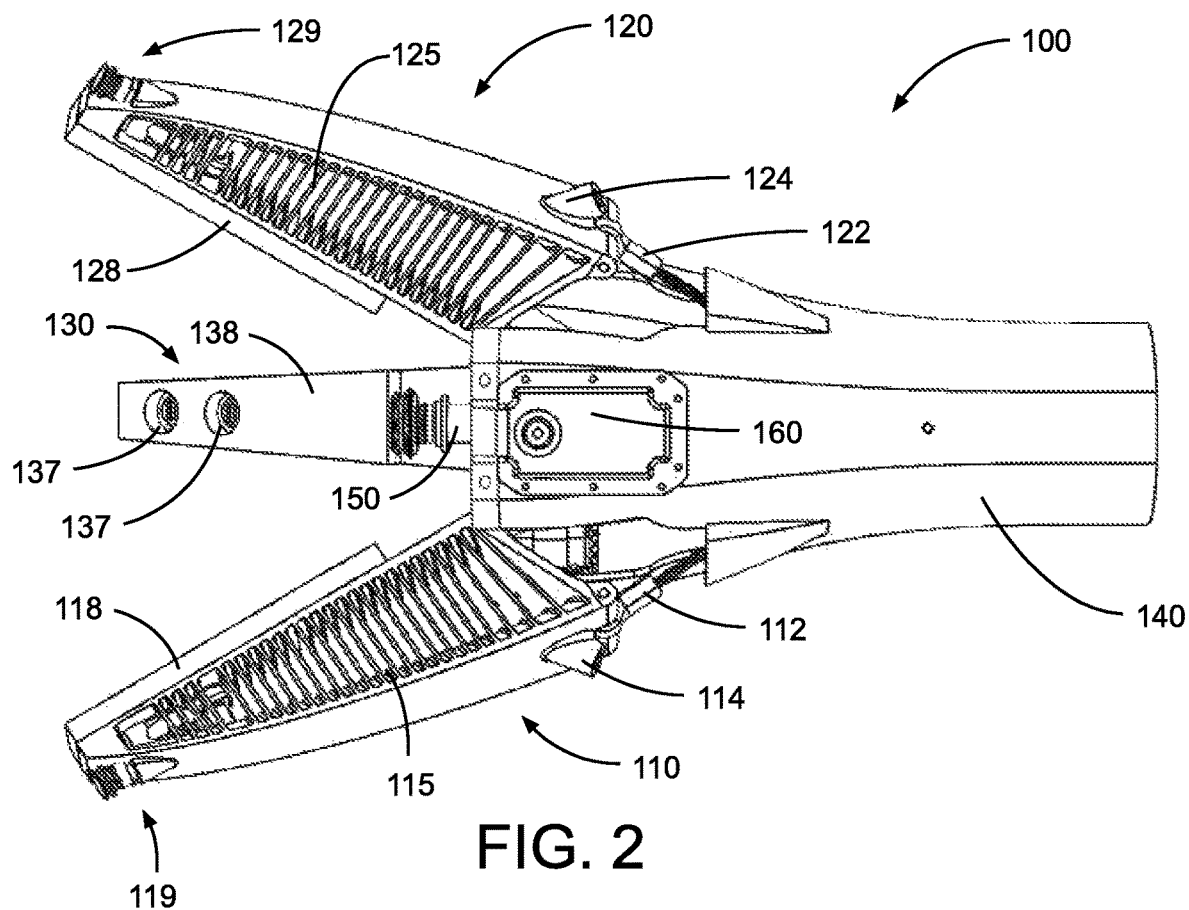
FIG. 2 shows a side view of the end effector of FIG. 1.
Figure 3:
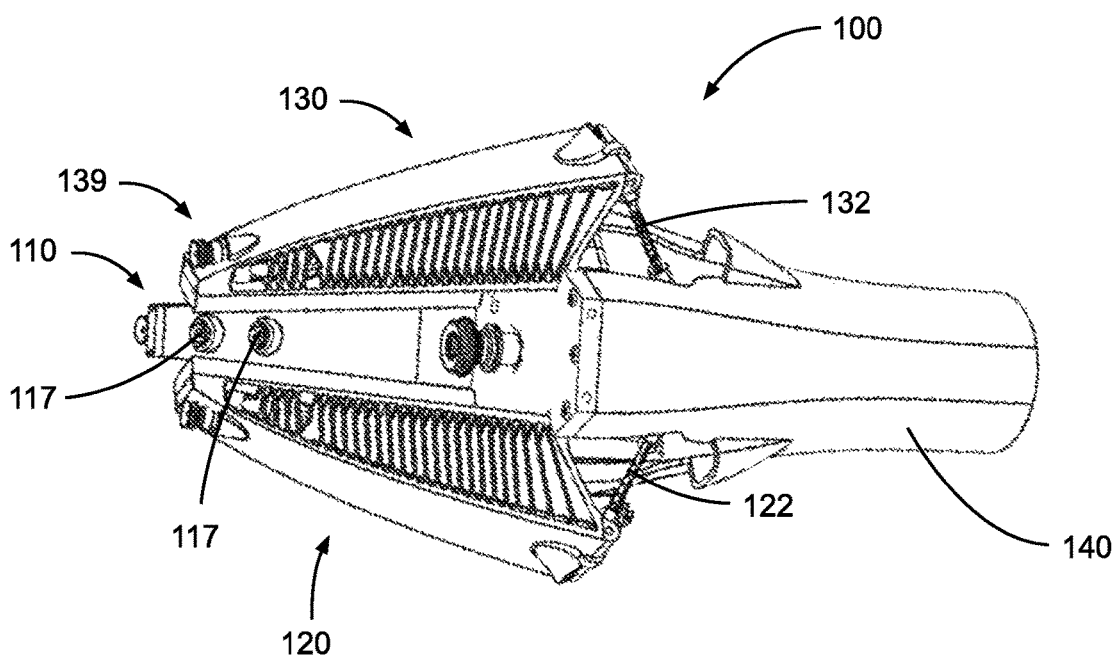
FIG. 3 shows a side view of the end effector of FIG. 1 in a closed position.
Figure 4:
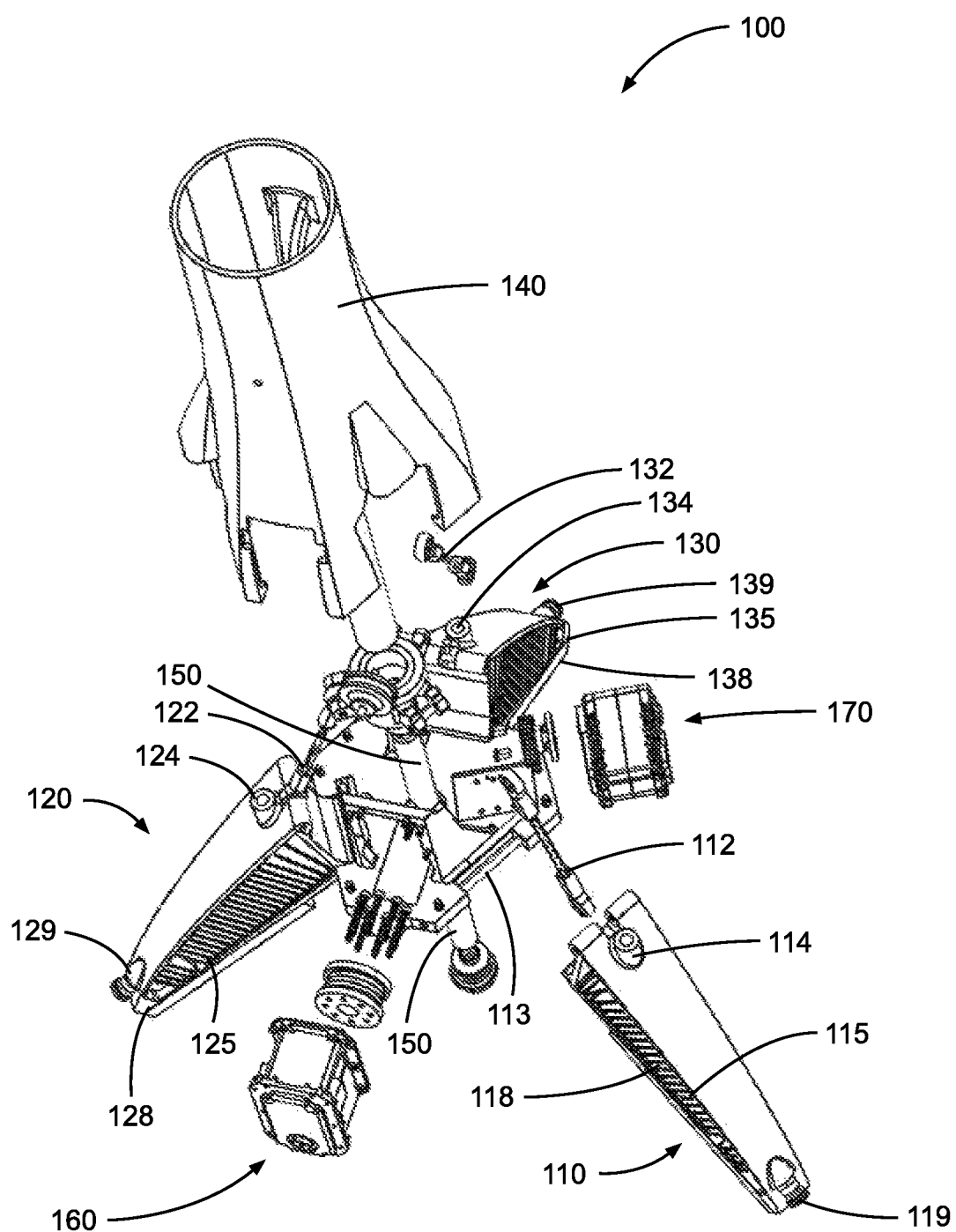
FIG. 4 shows an exploded perspective view of the end effector of FIG. 1.
Figure 5:
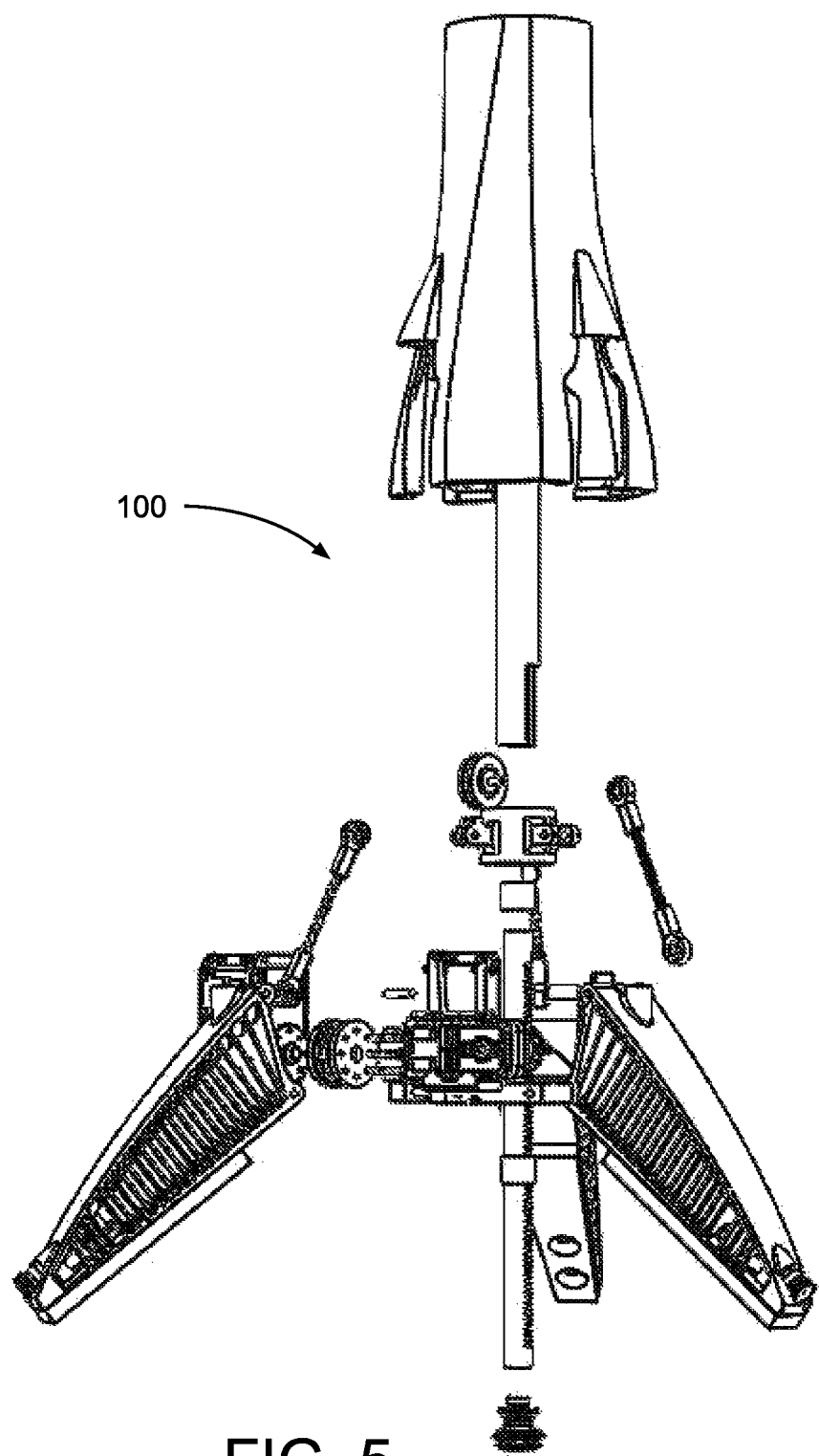
FIG. 5 shows an exploded side view of the end effector of FIG. 1.

FIG. 1 shows a perspective view of an end effector 100. The end effector 100 includes a first finger 110, a second finger 120, and a third finger 130, each pivotally connected to a hub 140. FIG. 2 shows a side view of the end effector 100 with the fingers 110, 120, 130 in an open position. FIG. 3 shows a side view of the end effector 100 with the fingers 110, 120, 130 in a closed position. FIGS. 4 and 5 show exploded perspective views of the end effector 100.

As shown in FIGS. 1, 2, 3, 4, and 5, the first finger 110 is pivotally connected to the hub 140 with shaft 113 and to a first actuator linkage 112 at its proximal end (best shown in FIG. 4). The second finger 120 is pivotally connected to the hub 140 with shaft 123 and is connected to a second actuator linkage 122, and the third finger 130 is pivotally connected to the hub 140 with shaft 133 and is connected to a third actuator linkage 132. Each finger 110, 120, 130 includes a port 114, 124, 134, respectively, that may be connected to a vacuum source, as well as cross beams 115, 125, 135 connecting the top of the finger with the bottom. Additionally, in the embodiment shown, each finger includes an elastomeric pad 118, 128, 138 and vacuum ports 117, 127, 137 on the bottom side of the finger, as well as a vacuum port 119, 129, 139 at the distal end. An extendable vacuum projection 150 is positioned within the hub 140. The extendable vacuum projection 150 may be connected to a vacuum source.

The end effector 100 further includes a first motor 160 and a second motor 170. First motor 160 may be connected to actuator linkages 112, 122, and 132. Second motor 170 may be connected to the extendable vacuum projection 150.

Though the end effector embodiment in FIGS. 1, 2, 3, and 4 illustrates an end effector with three fingers, an end effector may include more or fewer finger. For example, an end effector that is substantially similar to end effector 100 may include two finger or four fingers or more, as would be understood by one of ordinary skill in the art.

Figure 6:
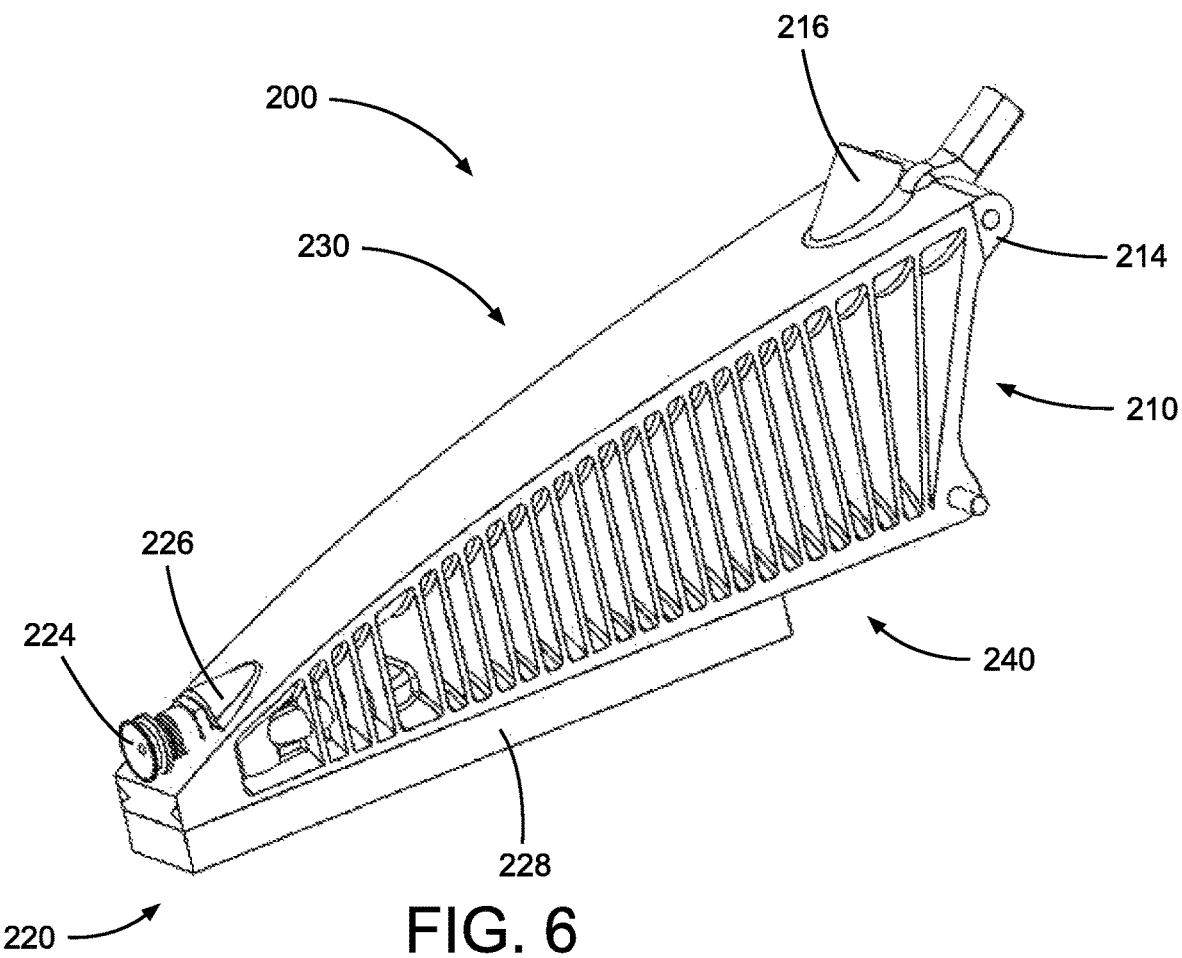
FIG. 6 shows a perspective view of one embodiment of a finger that may be used with an end effector.
Figure 7:
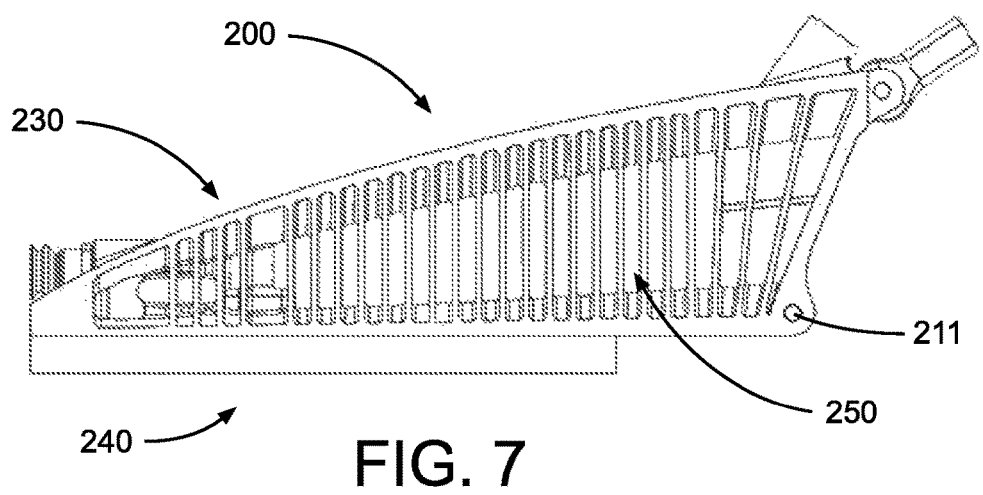
FIG. 7 shows a side view of the finger of FIG. 6.

FIG. 6 shows a perspective view of one embodiment of a finger 200 that may be used with an end effector, such as the end effector 100 shown in FIG. 1. FIG. 7 shows a side view of the finger 200. As shown in FIGS. 6 and 7, the finger 200 has a top side 230 and a bottom side 240. Cross beams 250 span the distance from the top side 230 to the bottom side 240. At a proximal end 210 of the finger 200, a pivot opening 211 is formed into a side, which may mate with a shaft, such as shaft 113 shown in FIG. 1. Additionally, an actuator connection portion 214 is formed into another side of the finger 200. A first vacuum port 216 is shown above the actuator connection portion 214. A second vacuum port 226 with an elastomeric flare 224 is shown at distal end 220 of the finger 200. The finger 200 further includes an elastomeric pad 228.

Figure 8:
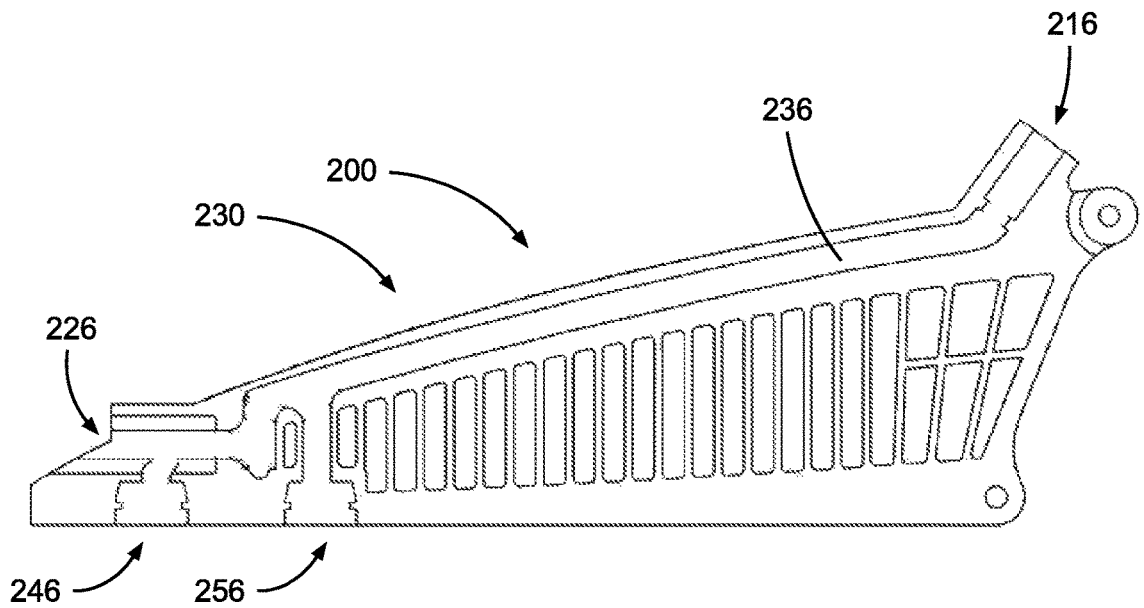
FIG. 8 shows a cutaway side view of the finger of FIG. 6.

FIG. 8 shows a cutaway side view of the finger 200. As shown in FIG. 8, a vacuum duct 236 runs along the top side 230 of the finger 200, from the first vacuum port 216 to the second vacuum port 226. A first side vacuum port 246 and a second side vacuum port 256 are also shown and are connected to the vacuum duct 236. Though the finger 200 shown in FIGS. 6, 7, and 8 includes three vacuum ports 226, 246, and 256 at the distal end 220 of the finger 200, the finger 200 may include a smaller or greater number of vacuum ports, as would be understood by one of ordinary skill in the art. For example, an embodiment of a finger may include a single side vacuum port. In another example, an embodiment of a finger may include three side vacuum ports.

Figure 9:
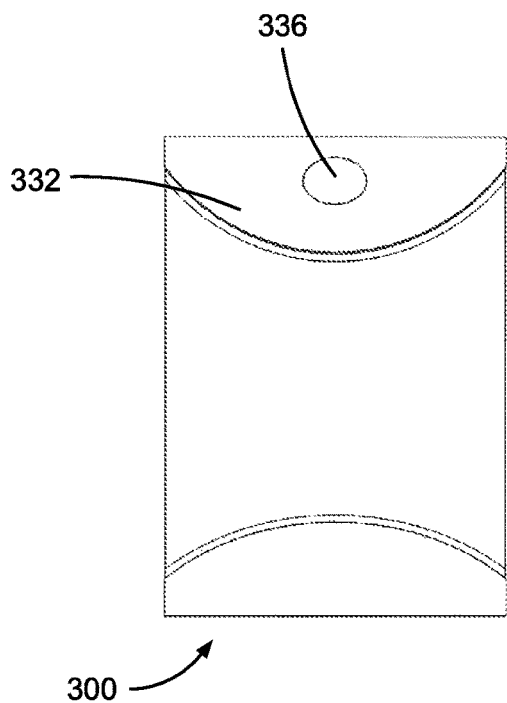
FIG. 9 shows a cutaway end view of the finger of FIG. 6.

FIG. 9 shows a cutaway end view of a finger 300. As shown, finger 300 includes a vacuum duct 336 within a semicircular portion 332. The semicircular portion of the finger 300 may substantially span the distance between a proximal and a distal end. In addition to containing the vacuum duct 336, the semicircular portion 332 may increase the rigidity and stability of the finger 300.

Figure 10:
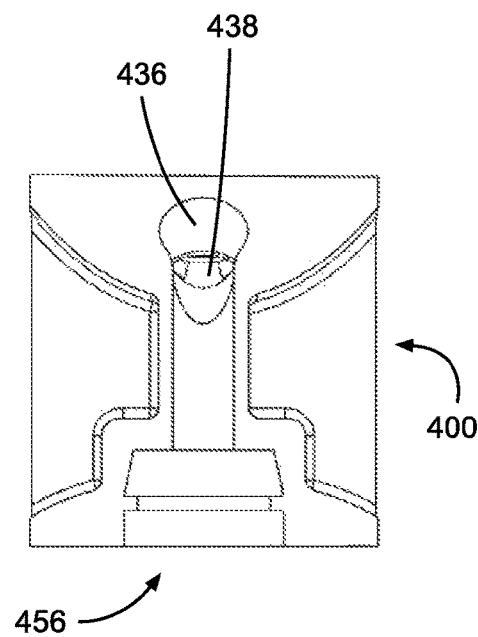
FIG. 10 shows a cutaway end view of the finger of FIG. 6, with a vacuum connector and a check valve.

FIG. 10 shows a cutaway end view of a finger 400, which may be similar to the finger 200 shown in FIG. 2. As shown, finger 400 includes a check valve 438 separating a vacuum duct 436 from a vacuum port 456. Check valve 438 may substantially restrict flow between vacuum duct 436 to vacuum port 456 when a vacuum source is attached to vacuum duct 436. Upon covering vacuum port 456, such as with an object, the check valve 438 may reduce its restriction.

Figure 11A:
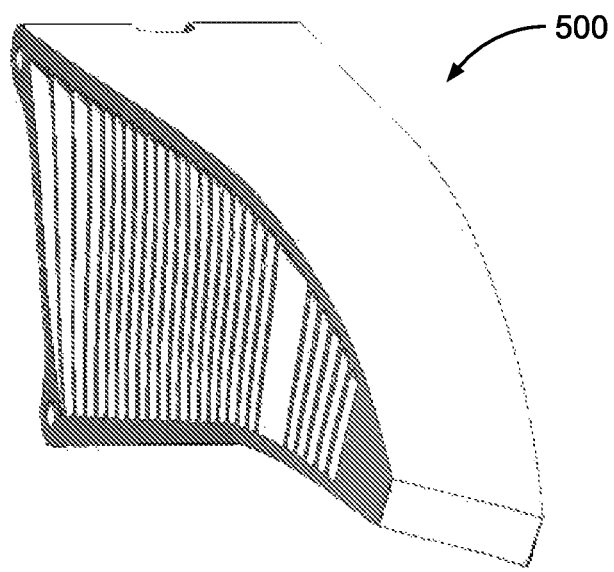
FIG. 11a shows a front perspective view of a finger.
Figure 11B:
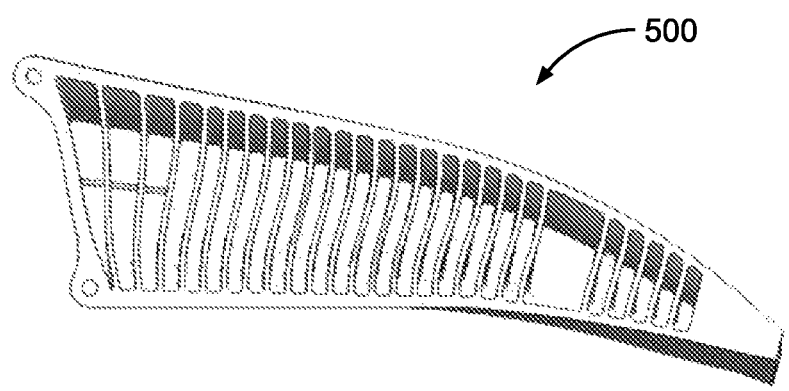
FIG. 11b shows a side perspective view of a finger.

Material used to form fingers 200, 300, or 400, for example, may be substantially elastomeric, enabling fingers 200, 300, 400 to flex, twist, or to conform to another shape when sufficient pressure is applied. FIGS. 11a and 11b show a front perspective and side perspective view of an embodiment of a finger 500 made with a substantially elastomeric material. As shown, sufficient pressure has been applied to the finger 500, causing the finger 500 to flex or conform along the length or width of the finger 500. In practice, FIGS. 11a and 11b may represent the finger 500 being positioned to contact an object, with the finger 500 substantially conforming to the shape of the object as pressure is applied, advantageously increasing the contact area and thus friction. When used within an end effector, such as, for example, the end effector 100, increased contact area and friction will typically enable a better grip.

Referring again to FIGS. 1, 2, 3, 4, and 5 end effector 100 can be used to grip or control an object by closing one or more of fingers 110, 120, 130 on the object, by using a vacuum port, such as vacuum ports 117, 119, 127, 129, 137, 139, or by using a combination thereof.

In a first example, end effector 100 may be used to grip an object with fingers 110, 120, 130 by activating first motor 160, moving actuator linkages 112, 122, 132 such that the fingers 110, 120, 130 pivot about shafts 113, 123, 133, thus closing around the object. Finger 110, 120, 130 may substantially conform to the shape of the object as they close. Though this example is described using three fingers, two fingers may be used, as one of ordinary skill in the art would understand.

In a second example, end effector 100 may be used to secure an object with a single finger, such as finger 110, by moving the finger 110 to substantially contact an object with vacuum port 119, creating a vacuum between finger 110 and the object, thus securing the object to the end effector 100.

In a third example, end effector 100 may be used to secure an object with a plurality of fingers, such as fingers 110, 120, 130, by moving the fingers 110, 120, 130 to substantially contact an object with vacuum ports 119, 129, 139, creating a vacuum between fingers 110, 120, 130 and the object, thus securing the object to the end effector 100.

In a fourth example, end effector 100 may be used to secure an object with a single finger, such as finger 110, by moving the finger 110 to substantially contact an object with one or more side vacuum ports, such as one or more of side vacuum ports 117, creating a vacuum between finger 110 and the object, thus securing the object to the end effector 100.

In a fifth example, end effector 100 may be used to secure an object with an extendable vacuum projection, such as extendable vacuum projection 150, by moving extendable vacuum projection 150, such as by actuating second motor 170, to substantially contact an object, creating a vacuum between extendable vacuum projection 150 and the object, thus securing the object to the end effector 100.

In a sixth example, end effector 100 may be used to secure an object with fingers 110, 120, 130 by activating first motor 160, extending actuator linkages 112, 122, 132 such that the fingers 110, 120, 130 pivot about shafts 113, 123, 133, thus closing finger 110, 120, 130 on the object, bringing side vacuum ports 117, 127, 137 in contact with the object, creating a vacuum between the object and fingers 110, 120, 130. Additionally, extendable vacuum projection 150 may be extended from hub 140 to contact the object, creating a vacuum between extendable vacuum projection 150 and the object. The combination of pressure from the fingers 110, 120, 130 and vacuum ports 117, 127, 137, 150 secures the object to the end effector 100.

Figure 12:
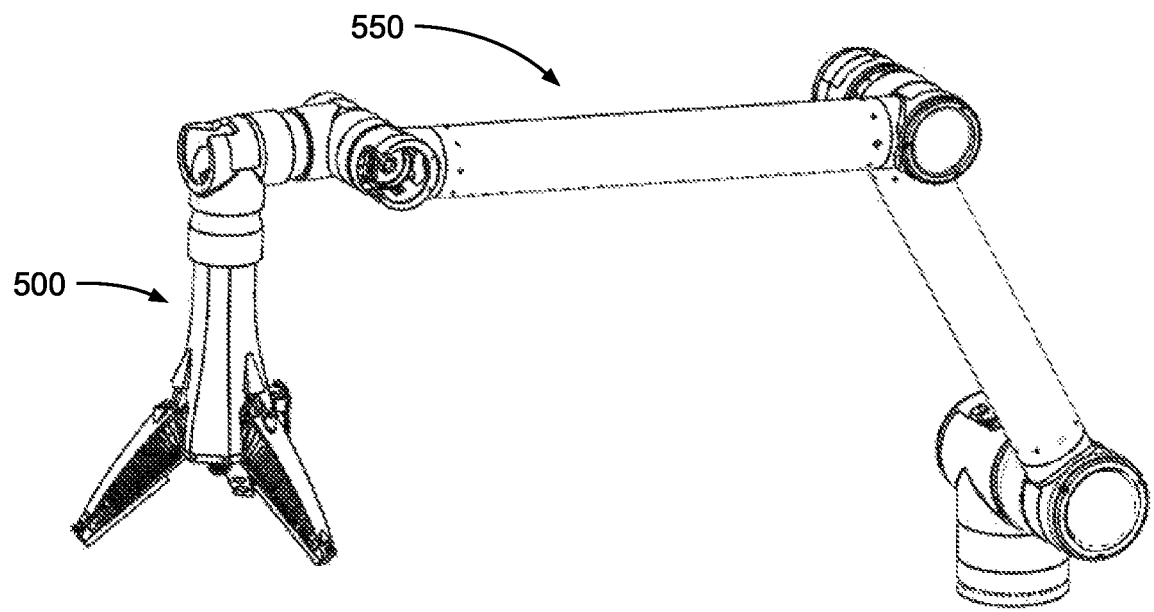
FIG. 12 shows an end effector connected to a robotic arm.

FIG. 12 shows an embodiment of an end effector 600 connected to a robotic arm 550. Robotic arm 550 may have six degrees of freedom allowing it to position end effector 600 in any position within the reach of the robotic arm 550. For example, robotic arm 550 may position the end effector 600 near an object such that the end effector 600 may grip, secure, or control the object, thereafter moving the object, secured to the end effector 600, to another location.

Figure 13:
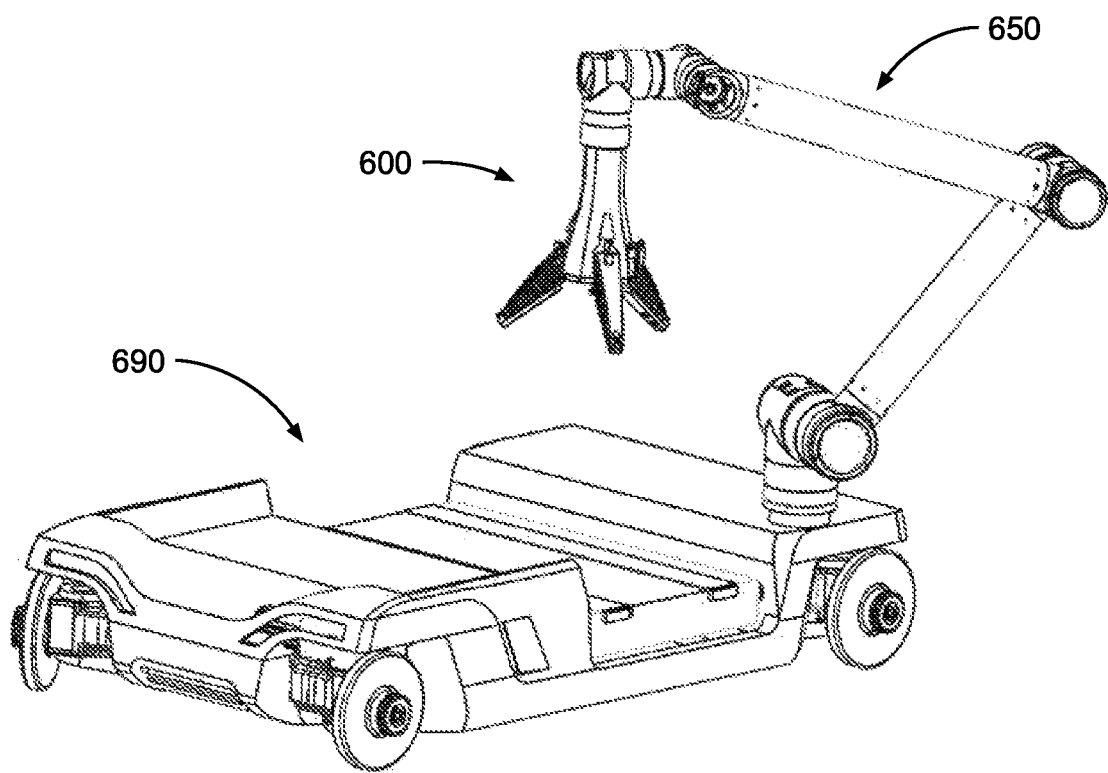
FIG. 13 shows an end effector connected to a robotic arm and mounted on an AGV.

FIG. 13 shows an embodiment of the end effector 600 connected to a robotic arm 650, which is additionally connected to a vehicle 690, such as an AGV. Robotic arm 650 may have six degrees of freedom allowing it to position end effector 600 in any position within the reach of the robotic arm 650. For example, robotic arm 650 may position the end effector 600 near an object such that the end effector 600 may grip, secure, or control the object, thereafter moving the object, secured to the end effector 600, to another location, such as to a portion of the vehicle 690. Vehicle 690 may move from a first position to a second position with the object. Thereafter, the end effector 600 and robotic arm 650 may reverse the process to move the object from the portion of the vehicle 690, placing it at or near the second position.

An end effector 1400 according to another example will be initially discussed with reference to FIGS. 14, 15, and 16. The end effector 1400 shares a number of features and operates in a similar fashion as the previously described end effectors. For example, the end effector 1400 can be used on the robotic arm 650 and vehicle 690 shown in FIG. 13. For the sake of brevity as well as clarity, these common features and functions will not be described again in great detail, but please refer to the earlier discussion of these features and functions.

Figure 14:
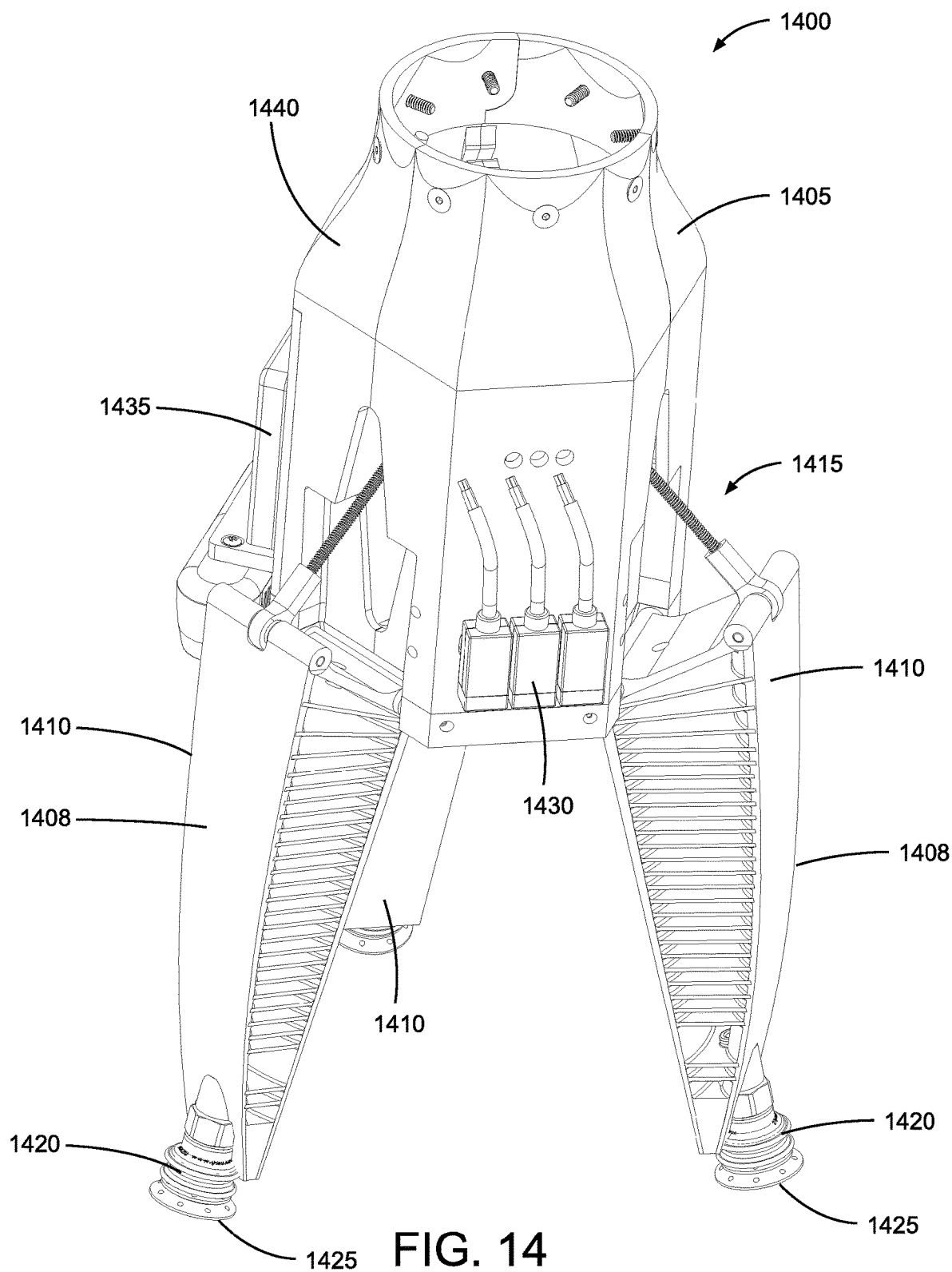
FIG. 14 is a top perspective view of an end effector.

As shown in FIG. 14, the end effector 1400 includes a hub 1405 and one or more fingers 1408 pivotally coupled to the hub 1405. In the illustrated example, the fingers 1408 are fin grippers 1410. The fin grippers 1410 are generally made of an elastic and/or soft material that allows the fin grippers 1410 to deform to generally conform to the shape of the gripped object. The end effector 1400 further has an actuator 1415 configured to actuate the fingers 1408. At the end, each of the fin grippers 1410 include at least one vacuum port 1420 with one or more vacuum cups 1425. The end effector 1400 further includes a pneumatic sensor manifold 1430 that is able to sense the vacuum (i.e., low pressure) supplied to the vacuum cups 1425 and a controller 1435 that controls the operation of the end effector 1400. As can be seen, the hub 1405 is covered by a housing 1440.

This unique design allows the end effector 1400 to pick a wide variety of items, both large and small as well as those difficult to handle. Again, the fingers 1408 in the illustrated example are in the form of fin grippers 1410 that are made of an elastic material, such as plastic and/or rubber (natural or synthetic). Via the actuator 1415, the end effector 1400 is able to open and close the fin grippers 1410 together to grip various objects. The fin grippers 1410 are deformable such that the end effector 1400 is able to grip a wide variety of objects with different shapes and other physical characteristics without losing grip of the objects. For smaller objects, the end effector 1400 supplies a vacuum to one or more of the vacuum cups 1425 at the tips of the fin grippers 1410 so as to pick up the object via suction. For example, the vacuum cup 1425 of a single fin gripper 1410 can be used to pick up a single item. The actuator 1415 can be used to close the fin grippers 1410 together such that the vacuum port 1420 at the fingertips of the fin grippers 1410 can be used together to pick or place objects via suction. Of course, there are other ways in which the end effector 1400 can pick and/or manipulate items.

Figure 15:
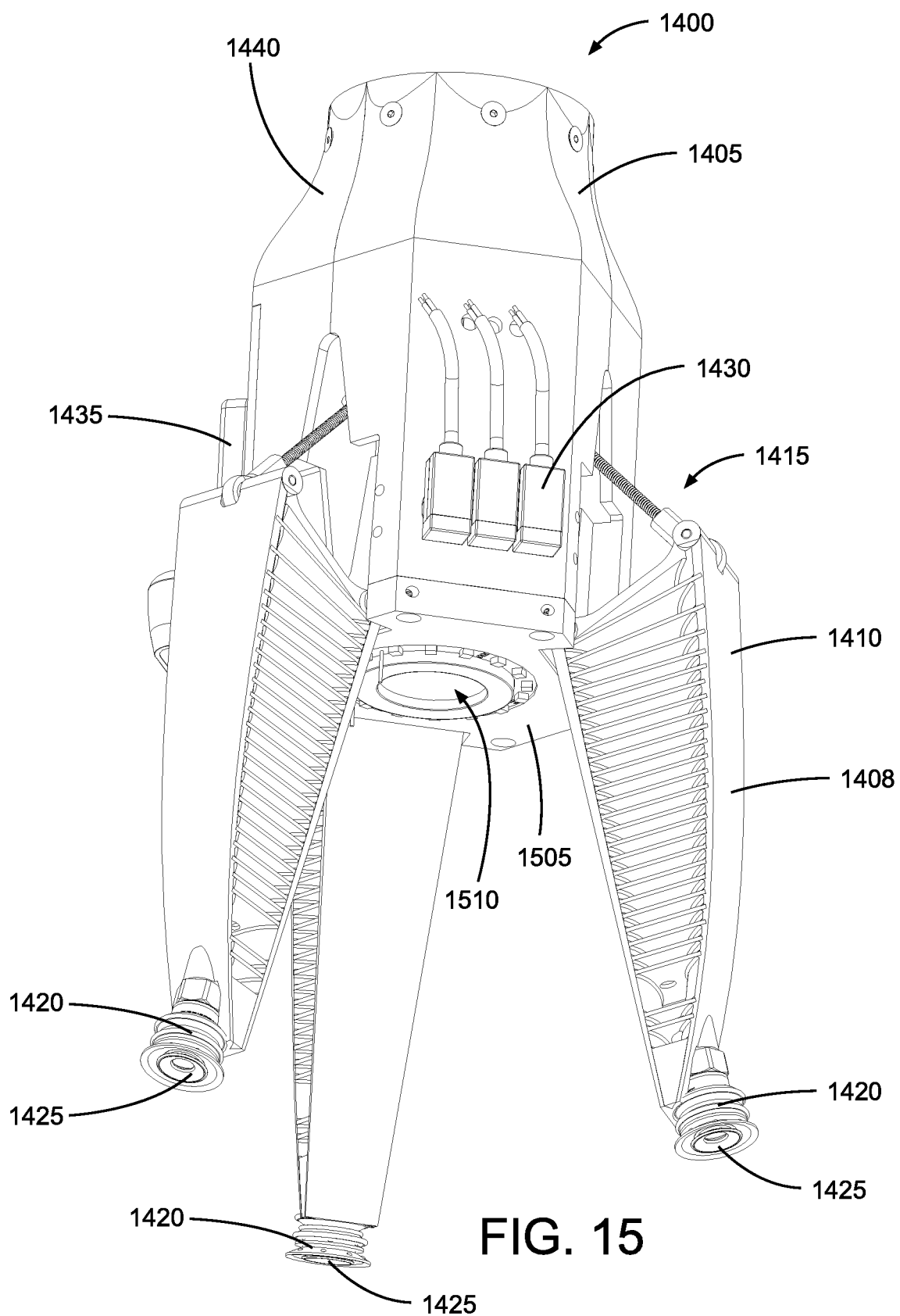
FIG. 15 is a bottom perspective view of the FIG. 14 end effector.
Figure 16:
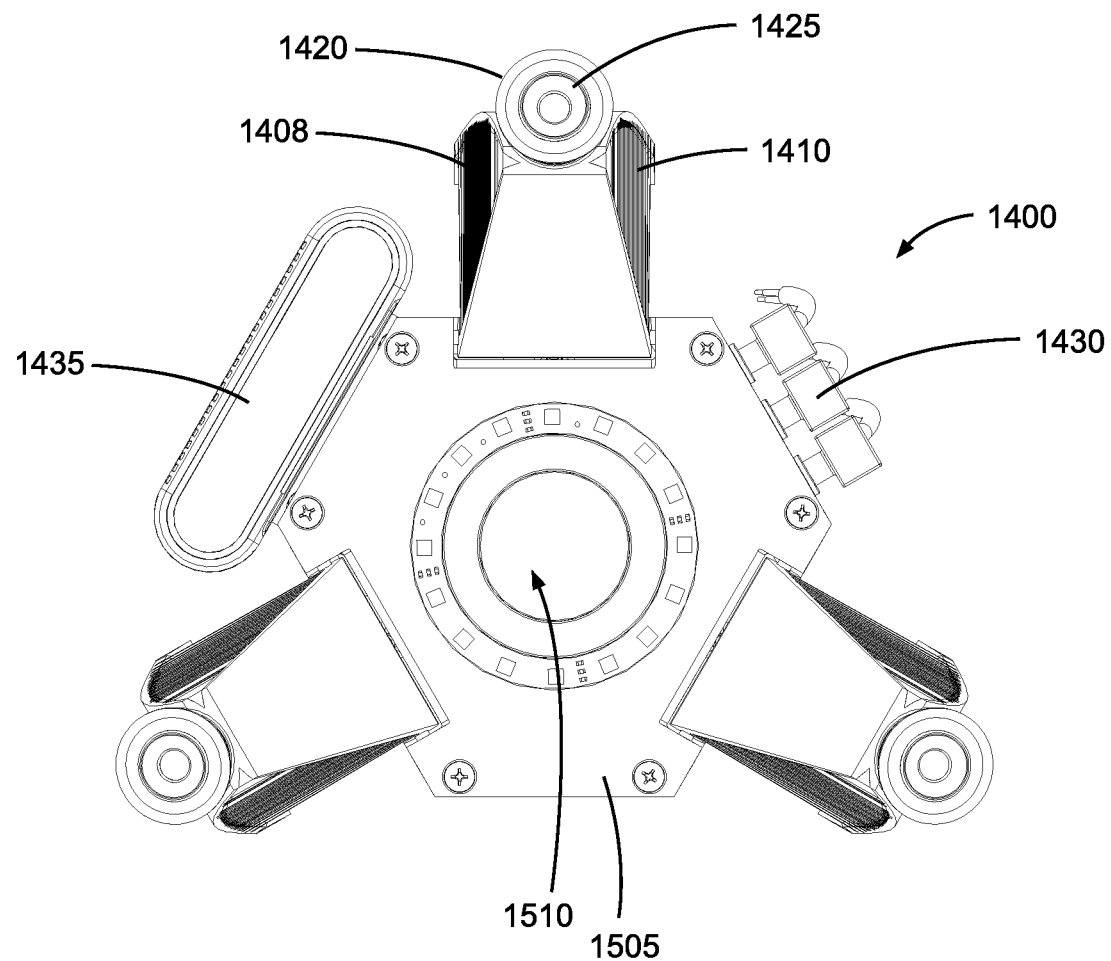
FIG. 16 is a top view of the FIG. 14 end effector.

Turning to FIGS. 15 and 16, the end effector 1400 includes a palm plate 1505 to which the fin grippers 1410 are pivotally attached to the hub 1405 such as via pins, rods, axles, and the like. In the illustrated example, the palm plate 1505 has one or more sensors 1510 to sense the objects being handled as well as environmental conditions. In one form, the sensor 1510 includes a vision system for visualizing the objects.

Figure 17:
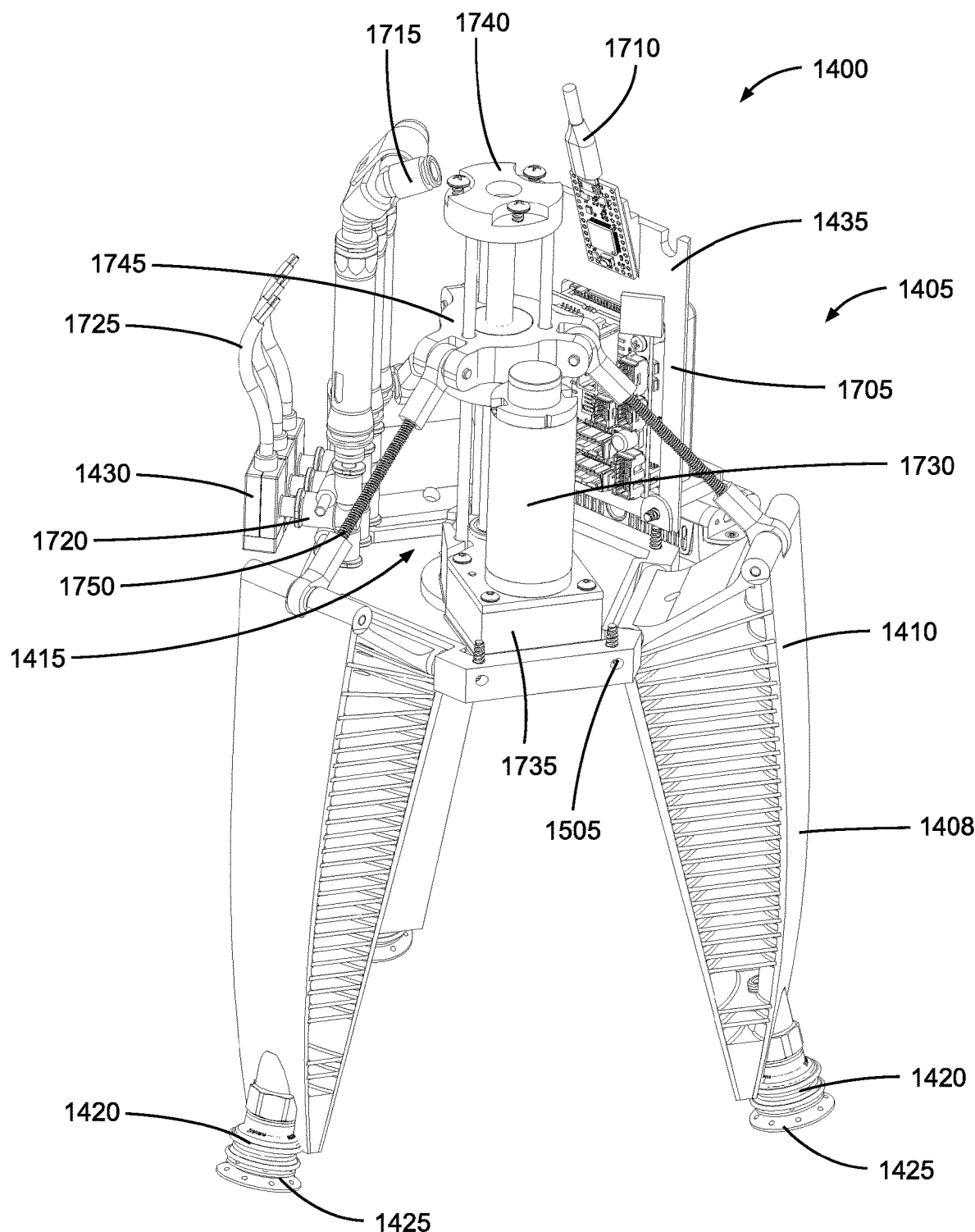
FIG. 17 is a top perspective view of the FIG. 14 end effector with the housing removed.
Figure 18:
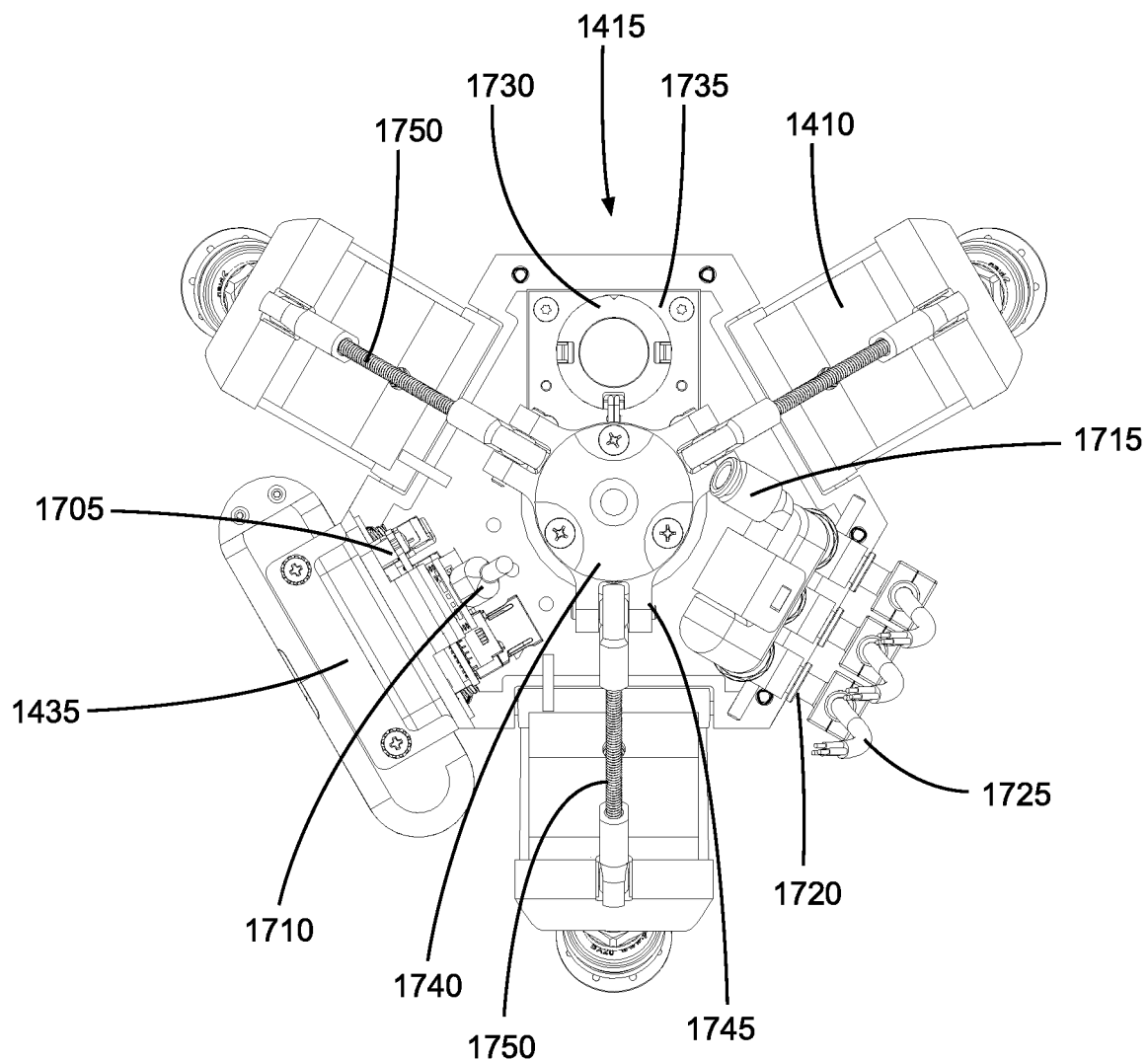
FIG. 18 is a top view of the FIG. 14 end effector with the housing removed.

FIGS. 17 and 18 show perspective and top views of the end effector 1400 with the housing 1440 removed from the hub 1405. As can be seen, the controller 1435 includes a circuit board 1705 with electronics programmed to control the end effector 1400. A data cable 1710 is connected to the circuit board 1705. The data cable 1710 allows the controller 1435 to communicate with the robotic arm 650 as well as the rest of the vehicle 690. Through the data cable 1710 the vehicle 690 is able to control the end effector 1400. Alternatively or additionally, a wireless type connection can be used to communicate with the controller 1435.

The pneumatic sensor manifold 1430 includes a vacuum supply port 1715 that is configured to connect with a vacuum supply line from the robotic arm 650 and/or the vehicle 690. The pneumatic sensor manifold 1430 includes one or more pressure sensors 1720 for sensing the vacuum or suction supplied to the vacuum cups 1425. By sensing the pressure at the vacuum cups 1425 with the pressure sensors 1720, the controller 1435 is able to determine whether or not the object is properly secured to the vacuum cups 1425. For instance, when the pressure sensor 1720 senses a vacuum or low pressure at one of the vacuum cups 1425, the controller 1435 infers that the manipulated object is adequately secured to the vacuum cup 1425. On the other hand, when the pressure sensor 1720 senses atmospheric or near atmospheric pressure (i.e., no or little vacuum), the controller 1435 determines that the object is not properly secured to the vacuum cup 1425. This ability to sense pressure at the vacuum ports 1420 allows the end effector 1400 to pick up and manipulate relatively small and/or difficult to handle objects that are not easily gripped by the fin grippers 1410 with the vacuum ports 1420. In one example, the number of pressure sensors 1720 corresponds to the number of vacuum ports 1420 so that the vacuum cups 1425 can be individually monitored, but in other examples, the pneumatic sensor manifold 1430 can include more or less pressure sensors 1720 such that a single pressure sensor 1720 for example monitors the pressure at more than one of the vacuum cups 1425. In the illustrated example, each pressure sensor 1720 has one or more sensor cables 1725 that are operatively connected to the controller 1435. Through the sensor cables 1725 the controller 1435 is able to determine the pressure at the vacuum ports 1420.

As depicted, the actuator 1415 includes a motor 1730, a gearbox 1735 operatively connected to the motor 1730, and a linkage drive 1740 operatively connected to the gearbox 1735. Through the linkage drive 1740, the motor 1730 is able open, close, or otherwise move the fin grippers 1410. The linkage drive 1740 includes a linkage plate 1745. As can be seen, one or more linkages 1750 are connected between the fin grippers 1410 and the linkage plate 1745. Movement of the linkage plate 1745 causes the linkages 1750 to move which in turn causes the fin grippers 1410 to pivot relative to the palm plate 1505. In one form, the linkages 1750 are threaded so as to adjust their relative length in order to adjust the relative position of the fin grippers 1410.

Figure 19:
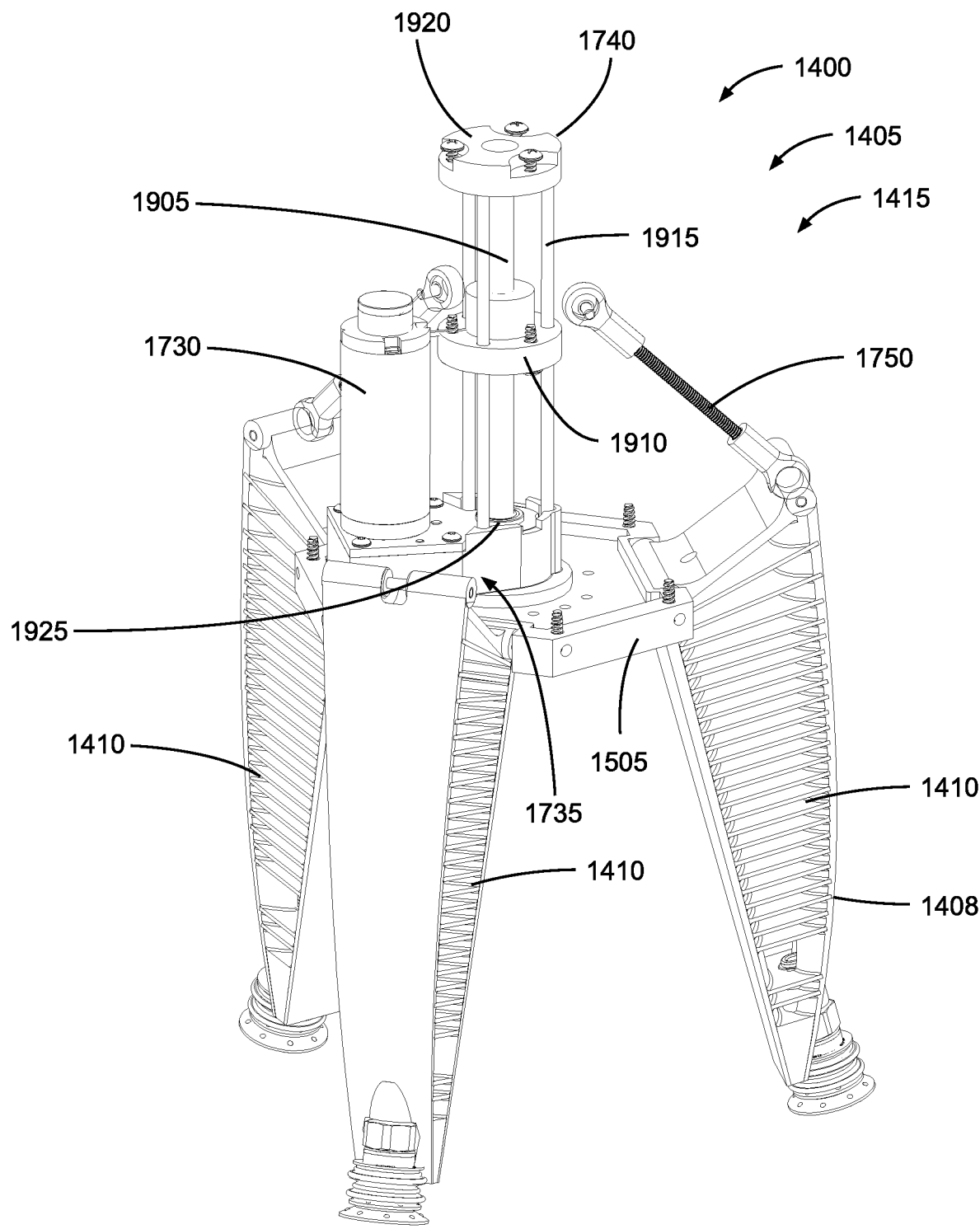
FIG. 19 is a top perspective view of the FIG. 14 end effector with selected components removed to view the actuator.
Figure 20:
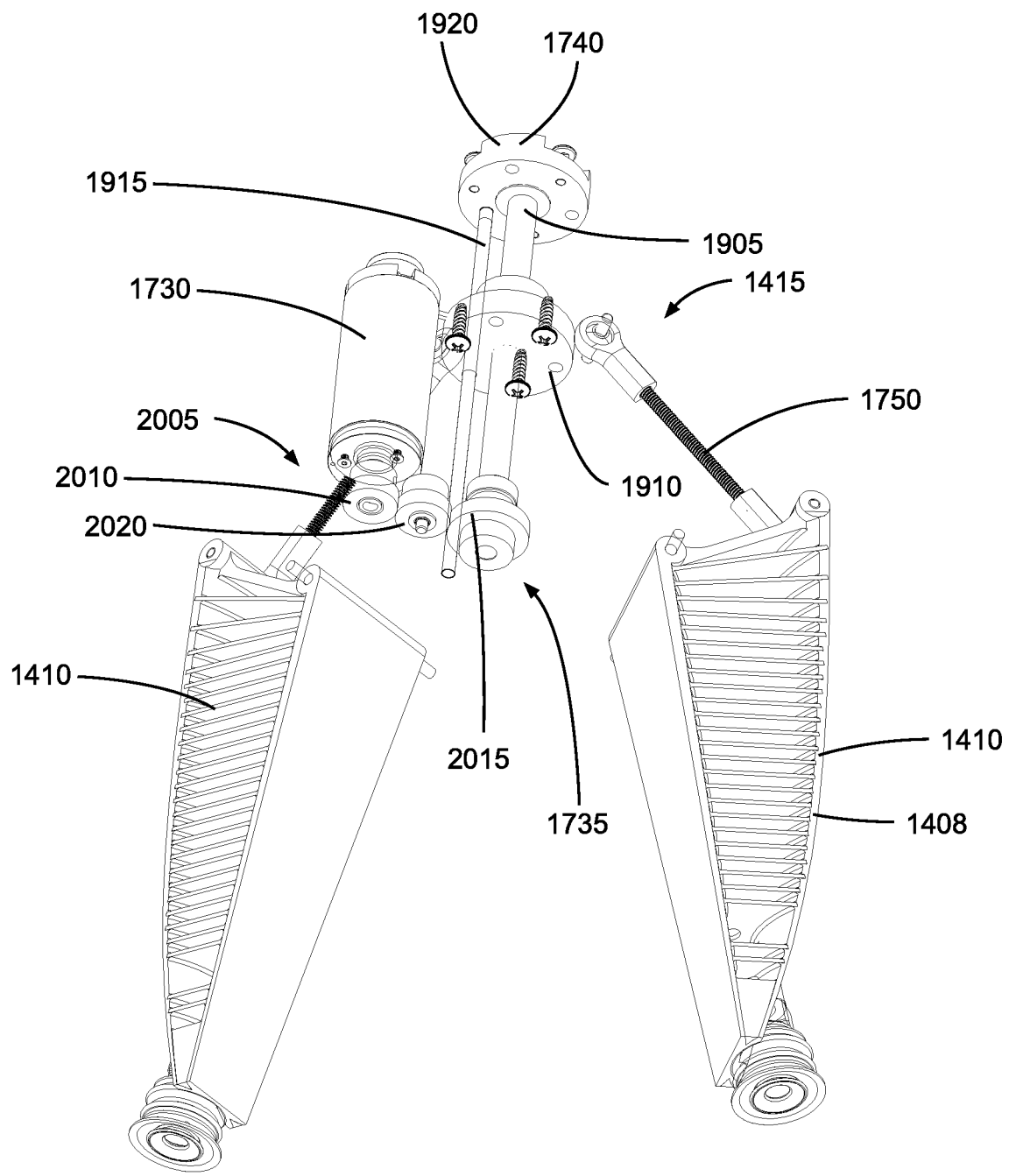
FIG. 20 is a bottom perspective view of the FIG. 14 end effector with selected components removed to view the gearbox of the actuator.

Looking at FIGS. 19 and 20, the linkage drive 1740 in the actuator 1415 further includes a drive shaft 1905 that is configured to move the linkage plate 1745 via a drive plate 1910. The drive plate 1910 is secured to the linkage plate 1745 such as via fasteners. In one form, the drive shaft 1905 is a threaded shaft and the drive plate 1910 is threadedly engaged to the drive shaft 1905. The motor 1730 through the gearbox 1735 rotates the drive shaft 1905 so as to cause the linkage plate 1745 to move. The linkage drive 1740 further includes one or more guide rods 1915 that guide and prevent rotation of the linkage plate 1745 and the drive plate 1910 while the drive shaft 1905 rotates. The ends of the guide rods 1915 are coupled together with an end bearing bracket 1920. The end bearing bracket 1920 has one or more bearings or bushings that engage one end of the drive shaft 1905 to allow the drive shaft 1905 to rotate. Proximal to the gearbox 1735, the linkage drive 1740 has a motor bearing bracket 1925 with bearings that are coupled to the other end of the drive shaft 1905 to allow the drive shaft 1905 to rotate. As shown, the motor bearing bracket 1925 further supports the motor 1730.

As shown in FIG. 20, the gearbox 1735 includes one or more gears 2005 that transfer power from the motor 1730 to the drive shaft 1905. In the depicted example, the gears 2005 include a motor gear 2010 connected to the output shaft of the motor 1730, a drive gear 2015 connected to the drive shaft 1905, and an idler gear 2020 connected between the motor gear 2010 and the drive gear 2015. Through these gears 2005, the motor 1730 is able to rotate the drive shaft 1905. Rotation of the drive shaft 1905 in turn causes the drive plate 1910 and the linkage plate 1745 to move along the guide rods 1915. This movement of the linkage plate 1745 results in the pivotal movement of the fin grippers 1410 through the linkages 1750 so as to open, close, or otherwise move the fin grippers 1410.

Figure 21:
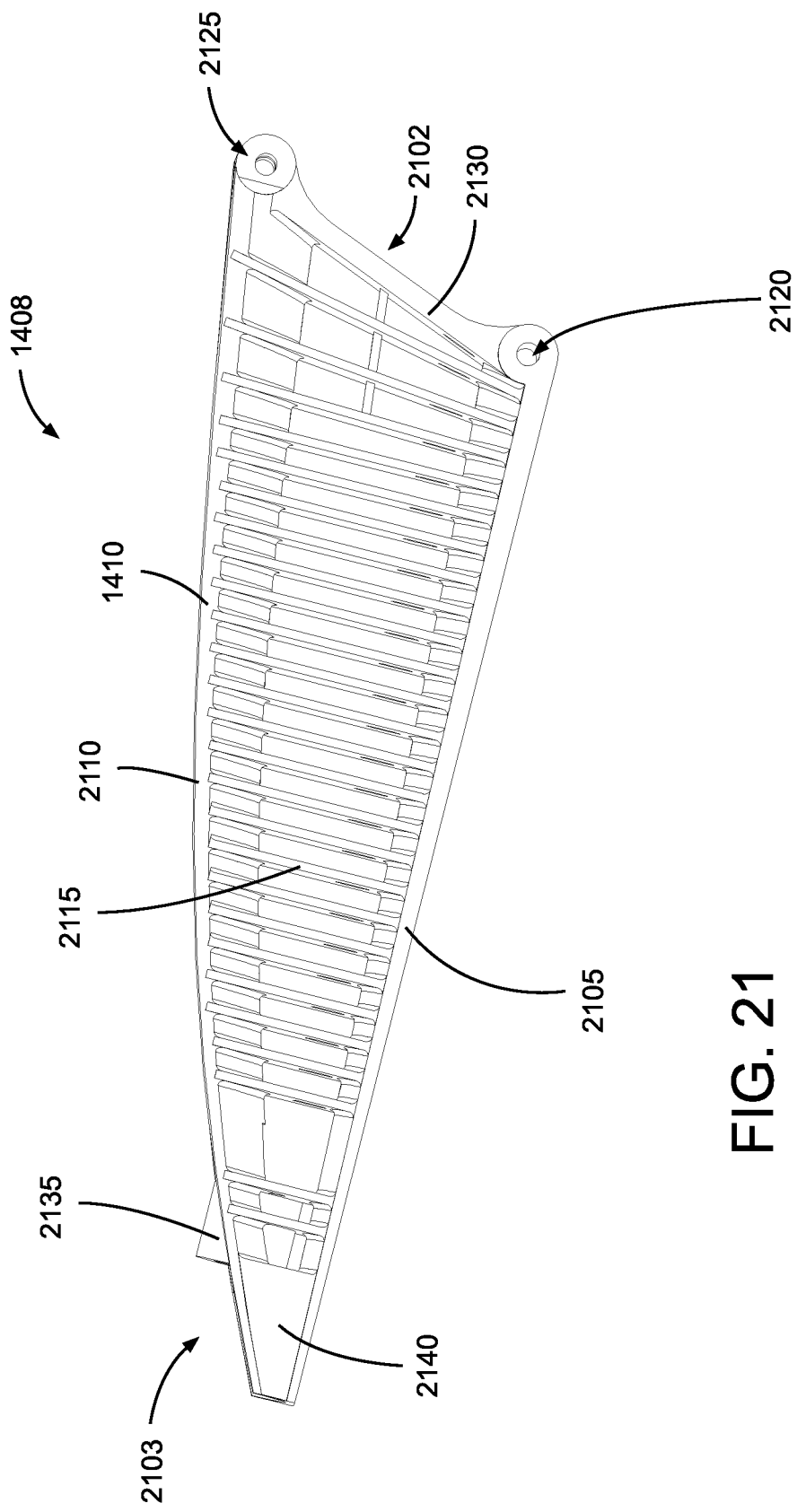
FIG. 21 is a side view of a fin gripper found in the FIG. 14 end effector.

As noted before, the fin grippers 1410 by being made of deformable material are designed to grab a wide variety of objects. Turning to FIG. 21, the fin gripper 1410 has a hub end 2102 and a fingertip end 2103. Extending between the hub end 2102 and the fingertip end 2103, the fin gripper 1410 has a contact flange 2105 where gripped objects contact the fin gripper 1410 and an exterior flange 2110. The fin gripper 1410 is V-shaped in which the contact flange 2105 and exterior flange 2110 extend at an acute angle relative to one another from the fingertip end 2103.

To make sure the fingertip end 2103 of the fin gripper 1410 bends in one direction (i.e., in a radial inward direction) so that the fingertip end 2103 grips underneath the object, the fin gripper 1410 has an asymmetric shape. In the depicted example, the exterior flange 2110 curves toward the fingertip end 2103 to give the fin gripper 1410 a shark fin overall shape. One or more cross beams 2115 extend between the contact flange 2105 and the exterior flange 2110. Gaps are formed between the cross beams 2115 that allow the cross beams 2115 to deform as the object is gripped.

At the hub end 2102, the fin gripper 1410 has a hub opening 2120 where the fin gripper 1410 is pivotally connected to the hub 1405 for example via a pin, screw, and the like. The hub end 2102 further has a linkage opening 2125 where the linkage 1750 is coupled to the fin gripper 1410 for example via a pin, screw, and the like. Between the hub opening 2120 and the linkage opening 2125, the fin gripper 1410 at the hub end 2102 has a hub end flange 2130. As can be seen, the fin gripper 1410 at the fingertip end 2103 has vacuum port support bracket 2135 configured to support and receive the vacuum port 1420. To provide stiffness at the fingertip end 2103 so as to support the vacuum port 1420, the fin gripper 1410 has a solid tip section 2140.

Figure 22:
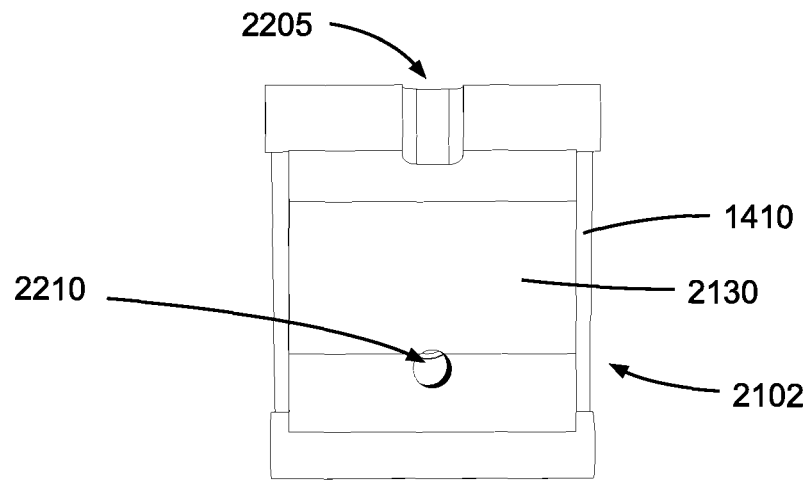
FIG. 22 is a rear view of the FIG. 21 fin gripper.
Figure 23:
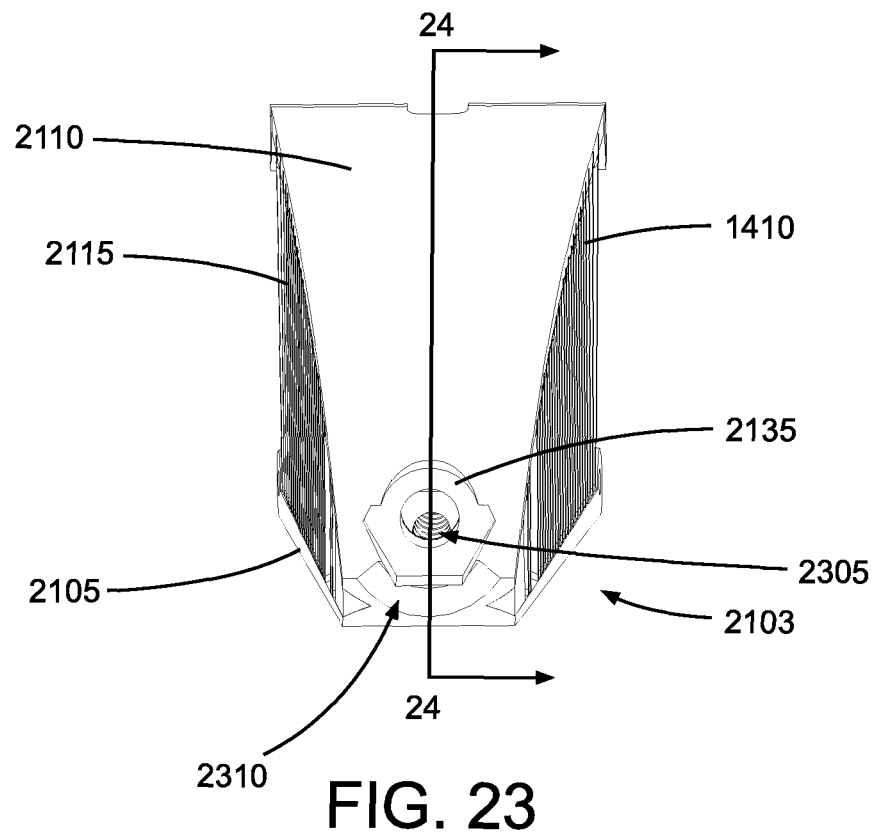
FIG. 23 is a front view of the FIG. 21 fin gripper.

Looking at FIG. 22 the hub end flange 2130 at the hub end 2102 has a linkage notch 2205 where the linkage 1750 is secured to the fin gripper 1410. The fin gripper 1410 further has in the hub end flange 2130 a hub vacuum port opening 2210 that is configured to receive a tube that connects the vacuum port 1420 at the fingertip end 2103 to the pressure sensor 1720 at the pneumatic sensor manifold 1430. Referring to FIG. 23, the fin gripper 1410 at the fingertip end 2103 has a vacuum port opening 2305 in the vacuum port support bracket 2135 configured to receive at least a portion of the vacuum port 1420. The fin gripper 1410 at the fingertip end 2103 further has a fingertip port notch 2310 for receiving a portion of the vacuum port 1420.

Figure 24:
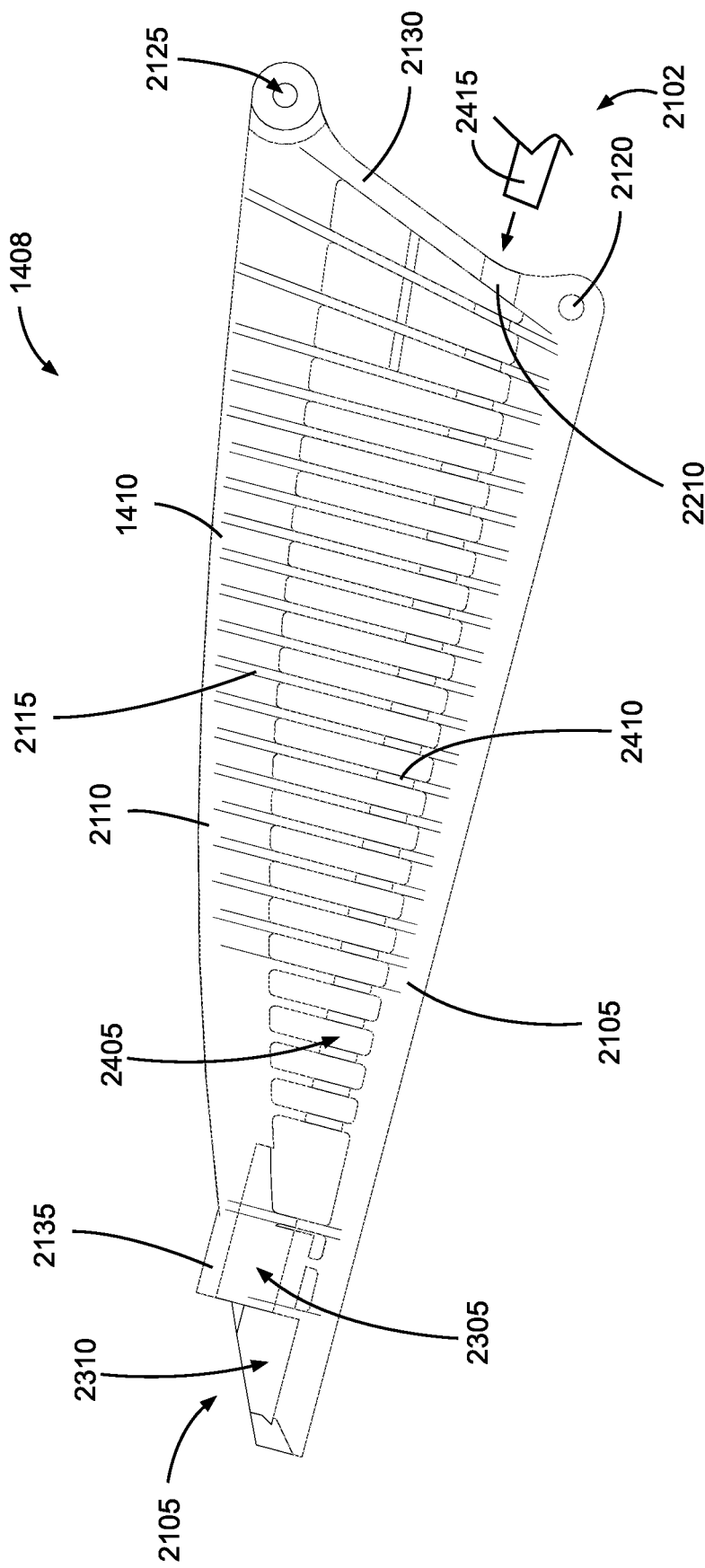
FIG. 24 is a cross-sectional view of the FIG. 21 fin gripper as taken along line 24-24 in FIG. 23.

FIG. 24 shows a cross-sectional view of the fin gripper 1410 as taken along line 24-24 in FIG. 23. As can be seen, the fin gripper 1410 defines a vacuum tube guide channel 2405 from the hub vacuum port opening 2210 to the vacuum port opening 2305. The vacuum tube guide channel 2405 is formed by a series of tube openings 2410 defined in the cross beams 2115. The vacuum tube guide channel 2405 is shaped to receive and support a tube 2415 from the pneumatic sensor manifold 1430 that supplies a vacuum or suction to the vacuum cup 1425 via the vacuum port 1420. The tube 2415 is typically, but not always, made whole or in part from a bendable or elastic material such as in the form of a plastic tube. With the vacuum tube guide channel 2405 disposed inside the fin gripper 1410, the tube 2415 is generally protected.

The end effector 1400 is able to pick a wide variety of items both large and small as well as those that are difficult to handle. In particular, the end effector 1400 allows individual products to be picked up via the fin grippers 1410, a vacuum pickup followed by using the fin grippers 1410, a single gripping option where the finger tips on the ends of the fin grippers 1410 are used alone, a multi-tip configuration in which the vacuum cups 1425 at the end of the tips are brought closer together and all of them are used to pick up the individual products, and a single finger adjacent picking up using the inside. Of course, there other ways in which the end effector 1400 can pick or manipulate items.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Acute" or "Acute Angle" generally refers to an angle smaller than a right angle or less than 90 degrees.

"Asymmetric" or "Asymmetrical" generally refers to a property of something having two sides or halves that are different from one another, such as in shape, size, and/or style. In other words, asymmetric describes something lacking a mirror-image quality.

"Automated Guided Vehicle" (AGV) or "Autonomous Mobile Unit" (AMU) generally refers to a mobile robot that is able to automatically self-navigate between various locations. For example, AGVs are typically, but not always, able to automatically navigate by following markers, such as wires or magnets embedded in the floor, by using lasers, and/or by using one or more vision systems. AGVs are also typically, but not always, designed to automatically avoid collisions, such as with other AGVs, equipment, and personnel. AGVs are commonly, but not always, used in industrial applications to move materials around a manufacturing facility or warehouse.

"Controller" generally refers to a device, using mechanical, hydraulic, pneumatic electronic techniques, and/or a microprocessor or computer, which monitors and physically alters the operating conditions of a given dynamical system. In one nonlimiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus a controller may include one or more physical processors or other computing devices or circuitry, and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Elastic" generally refers to a solid material and/or object that is capable of recovering size and/or shape after deformation. Elastic material typically is capable of being easily stretched, expanded, and/or otherwise deformed, and once the deforming force is removed, the elastic material returns to its original shape. By way of non-limiting examples, elastic materials include elastomers and shape memory materials. For instance, elastic materials can include rubber, both natural and synthetic, and plastics.

"End of Arm Tool" (EoAT) or "End Effector" generally refers to a device at the end of the robotic arm that is designed to interact with the environment. The nature of this interaction of the device with the environment depends on the application of the robotic arm. The EoAT can for instance interact with an SKU or other environmental objects in a number of ways. For example, the EoAT can include one or more grippers, such as impactive, ingressive, astrictive, and/or contiguitive type grippers. Grippers typically, but not always, use some type of mechanical force to grip objects. However, other types of interactions, such as those based on suction or magnetic force, can be used to secure the object to the EoAT. By way of non-limiting examples, the EoAT can alternatively or additionally include vacuum cups, electromagnets, Bernoulli grippers, electrostatic grippers, van der Waals grippers, capillary grippers, cryogenic grippers, ultrasonic grippers, and laser grippers, to name just a few.

"Fastener" generally refers to a hardware device that mechanically joins or otherwise affixes two or more objects together. By way of nonlimiting examples, the fastener can include bolts, dowels, nails, nuts, pegs, pins, rivets, screws, and snap fasteners, to just name a few.

"Fin Gripper" generally refers an A-frame shaped robotic finger that is flexible to securely grip a wide variety of objects, including fragile and/or irregularly shaped objects. The fin gripper is configured to act in a fashion similar to how a fish fin bends. The gripper fin includes flange members joined together at an acute angle to form a V shape, and the flanges are connected together by a series of spaced apart cross beams or bands to from a triangle. Typically, the fin gripper is made all or in part of deformable and/or elastic material that allows the fin gripper to bend, but portions of the fin gripper can include hard material. Pushing on one side of the V shape causes the fin gripper to deform in a tip portion of the fin gripper is able to bend around the gripped object. In other words, the fin gripper is able to adapt to the shape of a work piece when pressure is applied laterally. When the fin gripper has a symmetrical shape about a central axis, the fin gripper is able to bend in either lateral direction. On the other hand, when the fin gripper has an asymmetrical shape, the fin gripper tends to bend in only on direction.

"Motor" generally refers to a machine that supplies motive power for a device with moving parts. The motor can include rotor and linear type motors. The motor can be powered in any number of ways, such as via electricity, internal combustion, pneumatics, and/or hydraulic power sources. By way of non-limiting examples, the motor can include a servomotor, a pneumatic motor, a hydraulic motor, a steam engine, pneumatic piston, hydraulic piston, and/or an internal combustion engine.

"Pressure Sensor" generally refers to a device for pressure measurement of fluids, such as gases and/or liquids. Generally, the pressure sensor usually acts as a transducer by generating a signal as a function of the pressure imposed on the sensor. When the pressure sensor is an electronic type sensor, the generated signal can include an analog or digital signal. The pressure sensor can for example measure or detect pressure relative to a perfect vacuum, atmospheric pressure, a fixed pressure value, or a differential pressure value. By way of non-limiting examples, pressure sensors can include absolute, gauge, vacuum, differential, and sealed type pressure sensors. The pressure sensor can detect the pressure in a wide variety of ways, such as through capacitive, electromagnetic, piezoelectric, strain-gauge, optical, potentiometric, resonant frequency, thermal, and/or ionization techniques, to name just a few.

"Robotic Arm" or "Robot Arm" generally refers to a type of mechanical arm, usually programmable, with similar functions to a human arm. Links of the robot arm are connected by joints allowing either rotational motion (such as in an articulated robot) or translational (linear) displacement. The robot arm can have multiple axes of movement. By way of nonlimiting examples, the robot arm can be a 4, 5, 6, or 7 axis robot arm. Of course, the robot arm can have more or less axes of movement or freedom. Typically, but not always, the end of the robot arm includes a manipulator that is called an "End of Arm Tool" (EoAT) for holding, manipulating, or otherwise interacting with the cargo items or other objects. The EoAT can be configured in many forms besides what is shown and described herein.

"Sensor" generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems.

"Symmetric" or "Symmetrical" generally refers to a property of something having two sides or halves that are the same relative to one another, such as in shape, size, and/or style. In other words, symmetric describes something as having a mirror-image quality.

"Vacuum" generally refers to a space or state in which air or other gas pressure is significantly lower than ambient or atmospheric pressure. A vacuum can include a full vacuum in which the space is devoid of all matter or a partial vacuum in which some gas (or other matter) is still present in the space.

"Vacuum Cup" generally refers to a device or object made of elastic, flexible material having a surface that uses negative air pressure (i.e., a partial vacuum or suction) to adhere to a non-porous object.

"Vehicle" generally refers to a machine that transports people and/or cargo. Common vehicle types can include land based vehicles, amphibious vehicles, watercraft, aircraft, and space craft. By way of non-limiting examples, land based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

"Vision System" generally refers to one or more devices that collect data and form one or more images by a computer and/or other electronics to determine an appropriate position and/or to "see" an object. The vision system typically, but not always, includes an imaging-system that incorporates hardware and software to generally emulate functions of an eye, such as for automatic inspection and robotic guidance. In some cases, the vision system can employ one or more video cameras, Analog-to-Digital Conversion (ADC), and Digital Signal Processing (DSP) systems. By way of a non-limiting example, the vision system can include a charge-coupled device for inputting one or more images that are passed onto a processor for image processing. A vision system is generally not limited to just the visible spectrum. Some vision systems image the environment at infrared (IR), visible, ultraviolet (UV), and/or X-ray wavelengths. In some cases, vision systems can interpret three-dimensional surfaces, such as through binocular cameras.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

Although this invention has been described in terms of certain preferred embodiments, other embodiments that are apparent to those of ordinary skill in the art, including embodiments that do not provide all of the features and advantages set forth herein, are also within the scope of this invention. Therefore, the scope of the present invention is defined only by reference to the appended claims and equivalents thereof.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS 100 end effector
110 first finger
112 first actuator linkage
113 shafts
114 first port
115 cross beams
117 vacuum ports
118 elastomeric pad
119 vacuum ports
120 second finger
122 second actuator linkage
123 shafts
124 second port
125 cross beams
127 vacuum ports
128 elastomeric pad
129 vacuum ports
130 third finger
132 third actuator linkage
133 shafts
134 third port
135 cross beams
137 vacuum ports
138 elastomeric pad
139 vacuum ports
140 hub
150 extendable vacuum projection
160 first motor
170 second motor
200 fingers
210 proximal end
211 pivot opening
214 actuator connection portion
216 first vacuum port
220 distal end
224 elastomeric flare
226 second vacuum port
228 elastomeric pad
230 top side
236 vacuum duct
240 bottom side
246 first side vacuum port
250 cross beams
256 second side vacuum port
300 fingers
332 semicircular portion
336 vacuum duct
400 fingers
436 vacuum duct
438 check valve
456 vacuum port
500 finger
550 robotic arm
600 end effector
650 robotic arm
690 vehicle
1400 end effector
1405 hub
1408 fingers
1410 fin grippers
1415 actuator
1420 vacuum port
1425 vacuum cups
1430 pneumatic sensor manifold
1435 controller
1440 housing
1505 palm plate
1510 sensor
1705 circuit board
1710 data cable
1715 vacuum supply port
1720 pressure sensors
1725 sensor cables
1730 motor
1735 gearbox
1740 linkage drive
1745 linkage plate
1750 linkages
1905 drive shaft
1910 drive plate
1915 guide rods
1920 end bearing bracket
1925 motor bearing bracket
2005 gears
2010 motor gear
2015 drive gear
2020 idler gear
2102 hub end
2103 fingertip end
2105 contact flange
2110 exterior flange
2115 cross beams
2120 hub opening
2125 linkage opening
2130 hub end flange
2135 vacuum port support bracket
2140 solid tip section
2205 linkage notch
2210 hub vacuum port opening
2305 vacuum port opening
2310 fingertip port notch
2405 vacuum tube guide channel
2410 tube openings
2415 tube

What is claimed is:

1. A system, comprising:
an end effector including
one or more fin grippers having
a contact flange configured to contact a gripped object,
an exterior flange joined to the contact flange,
a fingertip end where the contact flange and the exterior flange are joined together,
a series of crossbeams connecting together the contact flange and the exterior flange, wherein the crossbeams are spaced apart from one another, wherein at least the contact flange and the crossbeams are made of an elastic material, wherein the contact flange and the exterior flange form an asymmetric shape to facilitate the contact flange bending around the gripped object when gripped, and one or more vacuum ports that include at least include a vacuum cup located at the fingertip end configured to secure difficult to grip objects via suction.

2. The system of claim 1, wherein the vacuum ports are located on interior surfaces of the fin grippers.

3. The system of claim 1, wherein the contact and exterior flanges extend at an acute angle from the fingertip.

4. The system of claim 3, wherein the contact flange is straight and the exterior flange is curved.

5. The system of claim 3, wherein the crossbeams each define a tube opening to form a tube guide channel between the contact and exterior flanges.

6. The system of claim 5, wherein the fin grippers have a vacuum port support bracket at the fingertip.

7. The system of claim 1, wherein the end effector includes a pneumatic sensor manifold configured to sense the vacuum applied by the vacuum cups.

8. The system of claim 7, wherein the end effector includes a controller configured to receive pressure data from the pneumatic sensor manifold.

9. The system of claim 7, wherein the end effector includes one or more tubes connecting the pneumatic sensor manifold and the vacuum cups.

10. The system of claim 9, wherein the fin grippers define one or more vacuum tube guide channels in which the tube extends inside the fin grippers.

11. The system of claim 1, wherein the end effector includes an actuator configured to actuate the fin grippers.

12. The system of claim 11, wherein the actuator includes a linkage drive and one or more linkages coupled between the fin grippers and the linkage drive.

13. The system of claim 12, wherein the actuator includes a motor and a gearbox operatively connected between the motor and the linkage drive.

14. The system of claim 13, wherein the actuator includes a threaded drive shaft and a linkage plated threadedly connected to the threaded drive shaft.

15. The system of claim 1, wherein the end effector includes a hub with a palm plate to which the fin grippers are pivotally coupled.

16. The system of claim 15, wherein the vacuum cups include an extendable palm vacuum cup configured to extend from the palm plate.

17. The system of claim 15, wherein the end effector has one or more sensors coupled to the palm plate.

18. The system of claim 17, wherein the sensors include a vision system sensor.

19. A system, comprising:
a fin gripper including
a contact flange that is straight,
an exterior flange that is curved,
a fingertip end where the contact flange and the exterior flange are joined together,
a hub end located opposite the fingertip end,
a series of crossbeams extending between the contact flange and the exterior flange to join the contact flange and the exterior flange together,
wherein the crossbeams are formed of an elastic material to facilitate deformation of the fin gripper during gripping,
at least one vacuum port located at the fingertip end, and
wherein the exterior flange defines a vacuum duct that extends from the hub end to the vacuum port at the fingertip end.

20. The system of claim 19, wherein the contact and exterior flanges are joined together and extend at an acute angle from the fingertip end.

21. The system of claim 19, wherein the fin gripper has an asymmetric shape.

22. The system of claim 19, wherein the fin gripper has a vacuum port support bracket at the fingertip end.

23. A method of grasping objects, comprising:
gripping a first object with fin grippers of an end effector, wherein the fin grippers are made of elastic material, wherein each the fin grippers each include a contact flange and an exterior flange that extend at an acute angle relative to one another, wherein each of the fin grippers include a series of crossbeams connected between the contact flange and the exterior flange, wherein the contact flange and the exterior flange are joined together at a fingertip end;
wherein said gripping includes deforming the fin grippers to bend around the first object; and
securing a second object with at least one vacuum port at the fingertip end on at least one of the fin grippers by applying suction to the vacuum port.

24. The method of claim 23, wherein the crossbeams deform as the contact flange bends during said gripping.

25. The method of claim 23, further comprising:
releasing the first object from the fin grippers by opening the fin grippers.

26. The method of claim 23, further comprising:
releasing the second object by ceasing suction to the vacuum port.

* * * * *